US012134169B2

(12) United States Patent
Schneider

(10) Patent No.: US 12,134,169 B2
(45) Date of Patent: *Nov. 5, 2024

(54) ROTARY IMPACT TOOL

(71) Applicant: MILWAUKEE ELECTRIC TOOL CORPORATION, Brookfield, WI (US)

(72) Inventor: Jacob P. Schneider, Cedarburg, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/155,396

(22) Filed: Jan. 17, 2023

(65) Prior Publication Data

US 2023/0150098 A1 May 18, 2023

Related U.S. Application Data

(63) Continuation of application No. 16/738,113, filed on Jan. 9, 2020, now Pat. No. 11,554,468.

(60) Provisional application No. 62/816,263, filed on Mar. 11, 2019, provisional application No. 62/790,350, filed on Jan. 9, 2019.

(51) Int. Cl.
*B25B 21/02* (2006.01)
*B25B 23/00* (2006.01)

(52) U.S. Cl.
CPC ........ *B25B 21/023* (2013.01); *B25B 23/0007* (2013.01)

(58) Field of Classification Search
CPC ....... B25B 23/00; B25B 23/04; B25B 23/045; B25B 23/0007; B25B 23/06; B25B 23/147; B25B 21/00; B25B 21/02; B25B 21/023; B25B 21/002; F16B 27/00
See application file for complete search history.

(56) References Cited

U.S. PATENT DOCUMENTS 6,651,990 B2 11/2003 Higasi et al.
7,063,332 B2 6/2006 Muller
(Continued)

OTHER PUBLICATIONS

Extended European Search Report for Application No. 20738975.0 dated Jan. 20, 2023 (9 pages).
(Continued)

*Primary Examiner* — Robert J Scruggs
(74) *Attorney, Agent, or Firm* — Michael Best & Friedrich LLP

(57) ABSTRACT

A rotary impact tool includes a housing, an electric motor, and a drive assembly for converting a continuous torque input from the motor to consecutive rotational impacts upon a workpiece. An anvil has a bore defining a hexagonal cross-sectional shape and having a nominal width of 7/16 inches. A hammer is rotationally and axially movable relative to the anvil for imparting the consecutive rotational impacts upon the anvil. A spring biases the hammer in an axial direction toward the anvil. A battery pack has a nominal voltage of at least 18 Volts and a nominal capacity of at least 5 Ah. The rotary impact tool has an overall weight including the battery pack that is less than or equal to 7.5 pounds. A second performance ratio of the rotary impact tool, defined as $(\eta_a \times RPM_{no\text{-}load}/Inertia_{hammer}) \times (1/216{,}000{,}000)$ is greater than 2.

22 Claims, 10 Drawing Sheets

(56) References Cited

U.S. PATENT DOCUMENTS

| | | | | |
|---|---|---|---|---|
| 8,622,401 | B2 | 1/2014 | Puzio et al. | |
| 8,800,999 | B2 | 8/2014 | Puzio et al. | |
| 9,289,886 | B2 | 3/2016 | Limberg et al. | |
| 9,308,630 | B2 | 4/2016 | Chen et al. | |
| 9,643,300 | B2 | 5/2017 | Kumagai et al. | |
| 10,471,573 | B2 | 11/2019 | Howard et al. | |
| 11,554,468 | B2 * | 1/2023 | Duncan | B25B 21/02 |
| 2005/0045002 | A1 | 3/2005 | Cluthe | |
| 2006/0191383 | A1 * | 8/2006 | Woods | B25B 13/06<br>81/177.85 |
| 2007/0193761 | A1 | 8/2007 | Brotto | |
| 2011/0188232 | A1 * | 8/2011 | Friedman | F21S 9/04<br>362/119 |
| 2012/0152579 | A1 | 6/2012 | Roehm | |
| 2014/0131059 | A1 * | 5/2014 | Verbrugge | B25F 5/008<br>173/217 |
| 2017/0144278 | A1 | 5/2017 | Nishikawa et al. | |
| 2017/0203418 | A1 * | 7/2017 | Kumagai | B25F 5/02 |

OTHER PUBLICATIONS

International Search Report and Written Opinion for Application No. PCT/US2020/012836 dated May 27, 2020 (22 pages).

* cited by examiner

ROTARY IMPACT TOOL

CROSS-REFERENCE TO RELATED APPLICATIONS

This application is a continuation of U.S. patent application Ser. No. 16/738,113, filed Jan. 9, 2020, now U.S. Pat. No. 11,554,468, which claims priority to U.S. Provisional Patent Application No. 62/816,263 filed on Mar. 11, 2019, and U.S. Provisional Patent Application No. 62/790,350 filed on Jan. 9, 2019, the entire contents of all of which are incorporated herein by reference.

FIELD OF THE INVENTION

The present invention relates to power tools, and more specifically to rotary impact tools.

BACKGROUND OF THE INVENTION

Rotary impact tools utilize a motor and a drive assembly for converting a continuous torque input from the motor to consecutive rotational impacts upon a workpiece. Some rotary impact tools include an electric motor and an onboard battery for powering the electric motor.

SUMMARY OF THE INVENTION

The present invention provides, in one aspect, a rotary impact tool comprising a housing, an electric motor supported in the housing, and a drive assembly for converting a continuous torque input from the motor to consecutive rotational impacts upon a workpiece of at least 900 ft-lbs of fastening torque. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7/16 inches. The drive assembly further includes a hammer that is both rotationally and axially movable relative to the anvil for imparting the consecutive rotational impacts upon the anvil. The drive assembly also includes a spring for biasing the hammer in an axial direction toward the anvil. The rotary impact tool further comprises a battery pack supported by the housing for providing power to the motor. The battery pack has a nominal voltage of at least 18 Volts and a nominal capacity of at least 5 Ah. The rotary impact tool has an overall weight including the battery pack that is less than or equal to 7.5 pounds. A ratio of the fastening torque to the overall weight is greater than or equal to 120 ft-lbs per pound.

The present invention provides, in yet another aspect, a rotary impact tool comprising a housing, an electric motor supported in the housing, and a drive assembly for converting a continuous torque input from the motor to consecutive rotational impacts upon a workpiece. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7/16 inches. The drive assembly further includes a hammer that is both rotationally and axially movable relative to the anvil for imparting the consecutive rotational impacts upon the anvil. The drive assembly also includes a spring for biasing the hammer in an axial direction toward the anvil. The rotary impact tool further comprises a battery pack supported by the housing for providing power to the motor. The battery pack has a nominal voltage of at least 18 Volts and a nominal capacity of at least 5 Ah. The rotary impact tool has an overall weight including the battery pack that is less than or equal to 7.5 lbs. A peak output speed of the drive assembly to the overall weight is greater than or equal to 280 revolutions per minute per pound.

The present invention provides, in yet another aspect, a rotary impact tool comprising a housing, an electric motor supported in the housing, and a drive assembly for converting a continuous torque input from the motor to consecutive rotational impacts upon a workpiece. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7/16 inches. The drive assembly further includes a hammer that is both rotationally and axially movable relative to the anvil for imparting the consecutive rotational impacts upon the anvil. The drive assembly also includes a spring for biasing the hammer in an axial direction toward the anvil. The rotary impact tool further comprises a battery pack supported by the housing for providing power to the motor. The battery pack has a nominal voltage of at least 18 Volts and a nominal capacity of at least 5 Ah. The rotary impact tool has an overall weight including the battery pack that is less than or equal to 7.5 pounds. A ratio of peak impact frequency provided by the drive assembly to the overall weight is greater than or equal to 350 impacts per minute per pound.

The present invention provides, in another aspect, a rotary impact tool comprising a housing, an electric motor supported in the housing, and a drive assembly for converting a continuous torque input from the motor to consecutive rotational impacts upon a workpiece of at least 975 ft-lbs of fastening torque. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7/16 inches. The drive assembly further includes a hammer that is both rotationally and axially movable relative to the anvil for imparting the consecutive rotational impacts upon the anvil. The drive assembly also includes a spring for biasing the hammer in an axial direction toward the anvil. The rotary impact tool further comprises a battery pack supported by the housing for providing power to the motor. The battery pack has a nominal voltage of at least 18 Volts and a nominal capacity of at least 9 Ah. The rotary impact tool has an overall weight including the battery pack that is less than or equal to 8.5 pounds. A ratio of the fastening torque to the overall weight is greater than or equal to 114 ft-lbs per pound.

The present invention provides, in yet another aspect, a rotary impact tool comprising a housing, an electric motor supported in the housing, and a drive assembly for converting a continuous torque input from the motor to consecutive rotational impacts upon a workpiece. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7/16 inches. The drive assembly further includes a hammer that is both rotationally and axially movable relative to the anvil for imparting the consecutive rotational impacts upon the anvil. The drive assembly also includes a spring for biasing the hammer in an axial direction toward the anvil. The rotary impact tool further comprises a battery pack supported by the housing for providing power to the motor. The battery pack has a nominal voltage of at least 18 Volts and a nominal capacity of at least 5 Ah. The rotary impact tool has an overall weight including the battery pack that is less than or equal to 7.5 lbs. A mechanism efficiency of the rotary impact tool is defined as:

$$\eta_a = \frac{BPM \times KE_{Hammer,Drilling}}{\text{Voltage}_{motor} \times \text{Current}_{motor}}$$

BPM is the number of impacts per minute, $KE_{Hammer,Drilling}$ is a kinetic energy of the hammer during a loaded condition and prior to impact with the anvil, $\text{Voltage}_{motor}$ is a voltage across the motor, and $\text{Current}_{motor}$ is a current drawn by the motor. A first performance ratio ($PR_1$) of the rotary impact tool is defined as:

$$PR_1 = \left(\frac{\eta_a}{\text{Inertia}_{hammer}}\right) \times \left(\frac{1}{216{,}000}\right)$$

$\text{Inertia}_{hammer}$ is a moment of inertia of the hammer. The first performance ratio of the rotary impact tool is greater than 1.

The present invention provides, in yet another aspect, a rotary impact tool comprising a housing, an electric motor supported in the housing, and a drive assembly for converting a continuous torque input from the motor to consecutive rotational impacts upon a workpiece. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7⁄16 inches. The drive assembly further includes a hammer that is both rotationally and axially movable relative to the anvil for imparting the consecutive rotational impacts upon the anvil. The drive assembly also includes a spring for biasing the hammer in an axial direction toward the anvil. The rotary impact tool further comprises a battery pack supported by the housing for providing power to the motor. The battery pack has a nominal voltage of at least 18 Volts and a nominal capacity of at least 5 Ah. The rotary impact tool has an overall weight including the battery pack that is less than or equal to 7.5 lbs. A mechanism efficiency of the rotary impact tool is defined as:

$$\eta_a = \frac{BPM \times KE_{Hammer,Drilling}}{\text{Voltage}_{motor} \times \text{Current}_{motor}}$$

BPM is the number of impacts per minute, $KE_{Hammer,Drilling}$ is a kinetic energy of the hammer during a loaded condition and prior to impact with the anvil, $\text{Voltage}_{motor}$ is a voltage across the motor, and $\text{Current}_{motor}$ is a current drawn by the motor. A second performance ratio ($PR_2$) of the rotary impact tool is defined as:

$$PR_2 = \left(\frac{\eta_a \times RPM_{no\text{-}load}}{\text{Inertia}_{hammer}}\right) \times \left(\frac{1}{216{,}000{,}000}\right)$$

$RPM_{no\text{-}load}$ is a rotational frequency of the impact mechanism under a no-load condition and $\text{Inertia}_{hammer}$ is a moment of inertia of the hammer. The second performance ratio of the rotary impact tool is greater than 2.

The present invention provides, in yet another aspect, a rotary impact tool comprising a housing, an electric motor supported in the housing, and a drive assembly for converting a continuous torque input from the motor to consecutive rotational impacts upon a workpiece. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7⁄16 inches. The drive assembly further includes a hammer that is both rotationally and axially movable relative to the anvil for imparting the consecutive rotational impacts upon the anvil. The drive assembly also includes a spring for biasing the hammer in an axial direction toward the anvil. The rotary impact tool further comprises a battery pack supported by the housing for providing power to the motor. The battery pack has a nominal voltage of at least 18 Volts and a nominal capacity of at least 5 Ah. The rotary impact tool has an overall weight including the battery pack that is less than or equal to 7.5 lbs. A mechanism efficiency of the rotary impact tool is defined as:

$$\eta_a = \frac{BPM > KE_{Hammer,Drilling}}{\text{Voltage}_{motor} \times \text{Current}_{motor}}$$

BPM is the number of impacts per minute, $KE_{Hammer,Drilling}$ is a kinetic energy of the hammer during a loaded condition and prior to impact with the anvil, $\text{Voltage}_{motor}$ is a voltage across the motor, and $\text{Current}_{motor}$ is a current drawn by the motor. A third performance ratio ($PR_3$) of the rotary impact tool is defined as:

$$PR_3 = \left(\frac{\eta_a}{\text{Mass}_{hammer}}\right) \times \left(\frac{1}{60}\right)$$

$\text{Mass}_{hammer}$ is a mass of the hammer. The third performance ratio of the rotary impact tool is greater than 2.

The present invention provides, in yet another aspect, a rotary impact tool comprising a housing, an electric motor supported in the housing, and a drive assembly for converting a continuous torque input from the motor to consecutive rotational impacts upon a workpiece. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7⁄16 inches. The drive assembly further includes a hammer that is both rotationally and axially movable relative to the anvil for imparting the consecutive rotational impacts upon the anvil. The drive assembly also includes a spring for biasing the hammer in an axial direction toward the anvil. The rotary impact tool further comprises a battery pack supported by the housing for providing power to the motor. The battery pack has a nominal voltage of at least 18 Volts and a nominal capacity of at least 5 Ah. The rotary impact tool has an overall weight including the battery pack that is less than or equal to 7.5 lbs. A mechanism efficiency of the rotary impact tool is defined as:

$$\eta_a = \frac{BPM > KE_{Hammer,Drilling}}{\text{Voltage}_{motor} \times \text{Current}_{motor}}$$

BPM is the number of impacts per minute, $KE_{Hammer,Drilling}$ is a kinetic energy of the hammer during a loaded condition and prior to impact with the anvil, $\text{Voltage}_{motor}$ is a voltage across the motor, and $\text{Current}_{motor}$ is a current drawn by the motor. A fourth performance ratio ($PR_4$) of the rotary impact tool is defined as:

$$PR_4 = \left(\frac{\eta_a \times RPM_{no\text{-}load}}{\text{Mass}_{hammer}}\right) \times \left(\frac{1}{3{,}600}\right)$$

$RPM_{no\text{-}load}$ is a rotational frequency of the impact mechanism under a no-load condition and $\text{Mass}_{hammer}$ is a mass of the hammer. The fourth performance ratio of the rotary impact tool is greater than 65.

The present invention provides, in yet another aspect, a rotary impact tool comprising a housing, an electric motor supported in the housing, and a drive assembly for converting a continuous torque input from the motor to consecutive rotational impacts upon a workpiece. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7⁄16 inches. The drive assembly further includes a hammer that is both rotationally and axially movable relative to the anvil for imparting the consecutive rotational impacts upon the anvil. The drive assembly also includes a spring for biasing the hammer in an axial direction toward the anvil. The rotary impact tool further comprises a battery pack supported by the housing for providing power to the motor. The battery pack has a nominal voltage of at least 18 Volts and a nominal capacity of at least 9 Ah. The rotary impact tool has an overall weight including the battery pack that is less than or equal to 8.5 lbs. A mechanism efficiency of the rotary impact tool is defined as:

$$\eta_a = \frac{BPM > KE_{Hammer,Drilling}}{\text{Voltage}_{motor} \times \text{Current}_{motor}}$$

BPM is the number of impacts per minute, $KE_{Hammer,Drilling}$ is a kinetic energy of the hammer during a loaded condition and prior to impact with the anvil, $\text{Voltage}_{motor}$ is a voltage across the motor, and $\text{Current}_{motor}$ is a current drawn by the motor and a voltage across the motor. A first performance ratio ($PR_1$) of the rotary impact tool is defined as:

$$PR_1 = \left(\frac{\eta_a}{\text{Inertia}_{hammer}}\right) \times \left(\frac{1}{216{,}000}\right)$$

$\text{Inertia}_{hammer}$ is a moment of inertia of the hammer. The first performance ratio of the rotary impact tool is greater than 1.

The present invention provides, in yet another aspect, a rotary impact tool comprising a housing, an electric motor supported in the housing, and a drive assembly for converting a continuous torque input from the motor to consecutive rotational impacts upon a workpiece. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7⁄16 inches. The drive assembly further includes a hammer that is both rotationally and axially movable relative to the anvil for imparting the consecutive rotational impacts upon the anvil. The drive assembly also includes a spring for biasing the hammer in an axial direction toward the anvil. The rotary impact tool further comprises a battery pack supported by the housing for providing power to the motor. The battery pack has a nominal voltage of at least 18 Volts and a nominal capacity of at least 9 Ah. The rotary impact tool has an overall weight including the battery pack that is less than or equal to 8.5 lbs. A mechanism efficiency of the rotary impact tool is defined as:

$$\eta_a = \frac{BPM > KE_{Hammer,Drilling}}{\text{Voltage}_{motor} \times \text{Current}_{motor}}$$

BPM is the number of impacts per minute, $KE_{Hammer,Drilling}$ is a kinetic energy of the hammer during a loaded condition and prior to impact with the anvil, $\text{Voltage}_{motor}$ is a voltage across the motor, and $\text{Current}_{motor}$ is a current drawn by the motor and a voltage across the motor. A second performance ratio ($PR_2$) of the rotary impact tool is defined as:

$$PR_2 = \left(\frac{\eta_a \times RPM_{no\text{-}load}}{\text{Inertia}_{hammer}}\right) \times \left(\frac{1}{216{,}000{,}000}\right)$$

$RPM_{no\text{-}load}$ is a rotational frequency of the impact mechanism under a no-load condition and $\text{Inertia}_{hammer}$ is a moment of inertia of the hammer. The second performance ratio of the rotary impact tool is greater than 2.

The present invention provides, in yet another aspect, a rotary impact tool comprising a housing, an electric motor supported in the housing, and a drive assembly for converting a continuous torque input from the motor to consecutive rotational impacts upon a workpiece. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7⁄16 inches. The drive assembly further includes a hammer that is both rotationally and axially movable relative to the anvil for imparting the consecutive rotational impacts upon the anvil. The drive assembly also includes a spring for biasing the hammer in an axial direction toward the anvil. The rotary impact tool further comprises a battery pack supported by the housing for providing power to the motor. The battery pack has a nominal voltage of at least 18 Volts and a nominal capacity of at least 9 Ah. The rotary impact tool has an overall weight including the battery pack that is less than or equal to 8.5 lbs. A mechanism efficiency of the rotary impact tool is defined as:

$$\eta_a = \frac{BPM > KE_{Hammer,Drilling}}{\text{Voltage}_{motor} \times \text{Current}_{motor}}$$

BPM is the number of impacts per minute, $KE_{Hammer,Drilling}$ is a kinetic energy of the hammer during a loaded condition and prior to impact with the anvil, $Voltage_{motor}$ is a voltage across the motor, and $Current_{motor}$ is a current drawn by the motor and a voltage across the motor. A third performance ratio ($PR_3$) of the rotary impact tool is defined as:

$$PR_3 = \left(\frac{\eta_a}{\text{Mass}_{hammer}}\right) \times \left(\frac{1}{60}\right)$$

$Mass_{hammer}$ is a mass of the hammer. The third performance ratio of the rotary impact tool is greater than 2.

The present invention provides, in yet another aspect, a rotary impact tool comprising a housing, an electric motor supported in the housing, and a drive assembly for converting a continuous torque input from the motor to consecutive rotational impacts upon a workpiece. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7/16 inches. The drive assembly further includes a hammer that is both rotationally and axially movable relative to the anvil for imparting the consecutive rotational impacts upon the anvil. The drive assembly also includes a spring for biasing the hammer in an axial direction toward the anvil. The rotary impact tool further comprises a battery pack supported by the housing for providing power to the motor. The battery pack has a nominal voltage of at least 18 Volts and a nominal capacity of at least 9 Ah. The rotary impact tool has an overall weight including the battery pack that is less than or equal to 8.5 lbs. A mechanism efficiency of the rotary impact tool is defined as:

$$\eta_a = \frac{BPM > KE_{Hammer,Drilling}}{\text{Voltage}_{motor} \times \text{Current}_{motor}}$$

BPM is the number of impacts per minute, $KE_{Hammer,Drilling}$ is a kinetic energy of the hammer during a loaded condition and prior to impact with the anvil, $Voltage_{motor}$ is a voltage across the motor, and $Current_{motor}$ is a current drawn by the motor and a voltage across the motor. A fourth performance ratio ($PR_4$) of the rotary impact tool is defined as:

$$PR_4 = \left(\frac{\eta_a \times RPM_{no-load}}{\text{Mass}_{hammer}}\right) \times \left(\frac{1}{3{,}600}\right)$$

$RPM_{no-load}$ is a rotational frequency of the impact mechanism under a no-load condition and $Mass_{hammer}$ is a mass of the hammer. The fourth performance ratio of the rotary impact tool is greater than 65.

The present invention provides, in yet another aspect, a rotary impact tool comprising a housing defining a rear of the rotary impact tool and a top of the rotary impact tool, an electric motor supported within the housing, a handle having a first end coupled to the housing and an opposite second end, a battery receptacle coupled to the second end of the handle, and a battery pack attachable to the battery receptacle. The battery pack defines a bottom of the rotary impact tool and provides power to the motor when attached to the battery receptacle. The rotary impact tool further includes a drive assembly for converting a continuous torque input from the motor to consecutive rotational impacts upon a workpiece. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7/16 inches. The distal end of the anvil defines a front of the rotary impact tool. The drive assembly further includes a hammer that is both rotationally and axially movable relative to the anvil for imparting the consecutive rotational impacts upon the anvil. The drive assembly also includes a spring for biasing the hammer in an axial direction toward the anvil. A tool length is defined between the rear of the rotary impact tool and the front of the rotary impact tool. A tool height is defined between the bottom of the rotary impact tool and the top of the rotary impact tool. A ratio of the tool length to the tool height is less than or equal to 1.

The present invention provides in yet another aspect, a rotary impact tool comprising a housing defining a top of the rotary impact tool, an electric motor supported within the housing, and a handle having a first end coupled to the housing and an opposite second end. The handle has a foot at the second end. The rotary impact tool further comprises a battery receptacle coupled to the foot of the handle and a battery pack attachable to the battery receptacle. The battery pack defines a bottom of the rotary impact tool and provides power to the motor when attached to the battery receptacle. The rotary impact tool further comprises a trigger on the handle to activate the motor. The trigger has a bottom lip in facing relationship with the foot of the handle. The rotary impact tool further comprises a drive assembly for converting a continuous torque input from the motor to consecutive rotational impacts upon a workpiece. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7/16 inches. The distal end of the anvil defines a front of the rotary impact tool. The drive assembly further includes a hammer that is both rotationally and axially movable relative to the anvil for imparting the consecutive rotational impacts upon the anvil. The drive assembly also includes a spring for biasing the hammer in an axial direction toward the anvil. A handle height is defined between a top surface of the foot and the bottom lip of the trigger and a tool height is defined between the bottom and the top of the rotary impact tool. A ratio of the handle height to the tool height is greater than or equal to 0.3.

The present invention provides, in yet another aspect, a rotary impact tool comprising a housing, an electric motor supported in the housing, and a drive assembly for converting a continuous torque input from the motor to consecutive rotational impacts upon a workpiece. The drive assembly includes an anvil having a bore in a distal end thereof for receipt of the workpiece or a tool bit for performing work on the workpiece. The bore defines a hexagonal cross-sectional shape in a plane oriented transverse to a rotational axis of the anvil and has a nominal width of 7/16 inches. The drive assembly further includes a hammer that is both rotationally and axially movable relative to the anvil for imparting the consecutive rotational impacts upon the anvil. The drive assembly also includes a spring for biasing the hammer in an axial direction toward the anvil. The rotary impact tool further includes a collar having a body surrounding the anvil. The collar is moveable along the anvil between a first position, in which the tool bit is locked within the anvil, and a second position, in which the tool bit is removable from the anvil. The collar is biased towards the first position. The collar includes knurling on an outer surface of the body and a lip extending away from the rotational axis that is graspable by a user for moving the collar from the first positon to the second position.

The present invention provides, in yet another aspect, a rotary impact tool comprising a housing, an electric motor supported in the housing, and a drive assembly for converting a continuous torque input from the motor to consecutive rotational impacts upon a workpiece. The drive assembly includes an anvil having an outer surface and a longitudinal bore in a distal end of the anvil configured to receive a tool bit for performing work on the workpiece. The tool bit has a bit recess. The bore defines a hexagonal cross-sectional shape in a plane oriented transverse to a rotational axis of the anvil and the bore has a nominal width of 7/16 inches. The drive assembly further includes a plunger detent aperture extending radially inward from the outer surface to the bore, a bit detent aperture extending radially inward from the outer surface to the bore, a hammer that is both rotationally and axially movable relative to the anvil for imparting the consecutive rotational impacts upon the anvil, and a hammer spring for biasing the hammer in an axial direction toward the anvil. The rotary impact tool further comprises a bit detent arranged in the bit detent aperture. The bit detent is moveable between a first bit detent position, in which the bit detent is at least partially in the bore, and a second bit detent position, in which the bit detent is out of the bore. The rotary impact tool further comprises a plunger in the bore. The plunger has a plunger detent recess. The rotary impact tool further comprises a plunger detent arranged in the plunger detent aperture. The plunger detent is moveable between a first plunger detent position, in which the plunger detent is at least partially in the plunger detent recess, and a second plunger detent position, in which the plunger detent is out of the plunger detent recess. The rotary impact tool further comprises a plunger spring biasing the plunger toward the distal end of the anvil, an O-ring at least partially arranged in the bit detent aperture, and a collar surrounding the anvil. The collar is moveable along the anvil between a first collar position, in which the plunger detent is inhibited by the collar from moving from the first plunger detent position to the second plunger detent position, and the bit detent is inhibited by the collar from moving from the first bit detent position to second bit detent positon, and a second collar position, in which the plunger detent is moveable by the plunger from the first plunger detent position to the second plunger detent position, and the bit detent is moveable from the first bit detent position to the second bit detent position. The collar is biased towards the first collar position. When the collar is in the second collar position and the tool bit is inserted into the bore, the O-ring is deformable by the bit detent, such that the bit detent is moveable by the bit from the first bit detent position to the second bit detent position. When the collar is in the first collar position and the tool bit is in the bore, the bit detent is in the bit recess, such that the tool bit is locked within the bore. When the collar is moved from the first collar position to the second collar position when the tool bit is in the bore, the tool bit is ejectable from the bore by the plunger.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
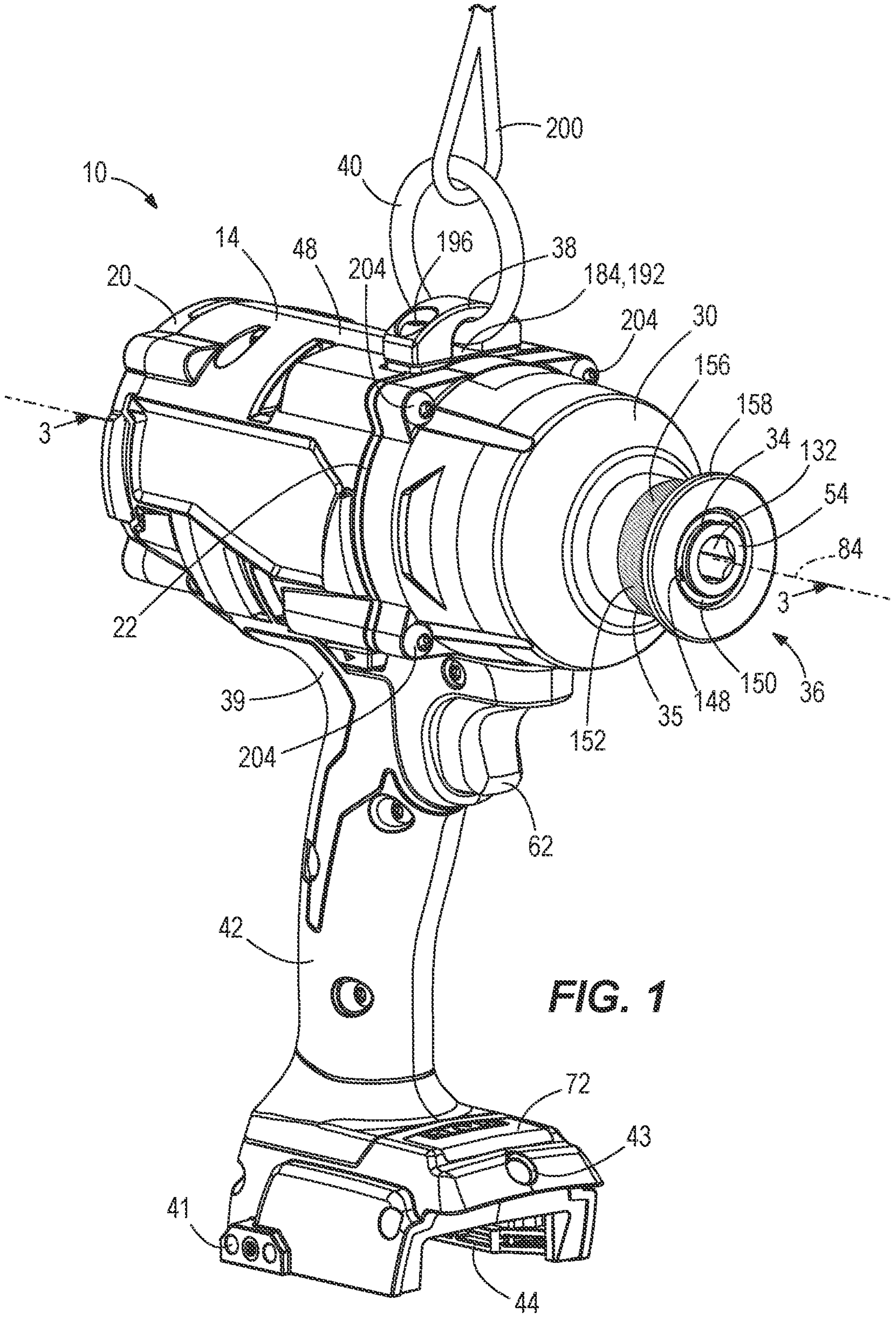
FIG. 1 is a perspective view of a rotary impact driver in accordance with an embodiment of the invention.
Figure 2:
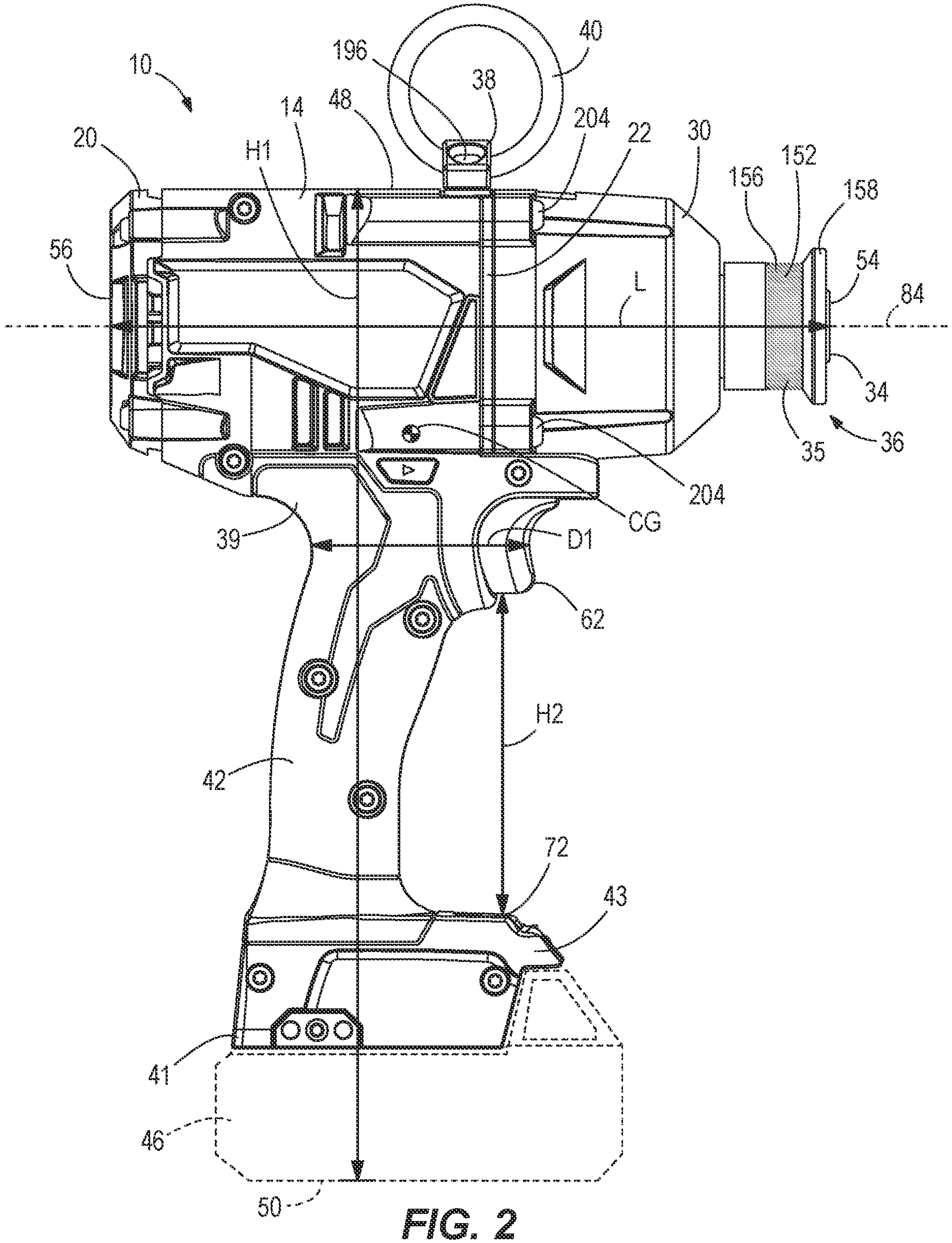
FIG. 2 is a plan view of the impact driver of FIG. 1.
Figure 3:
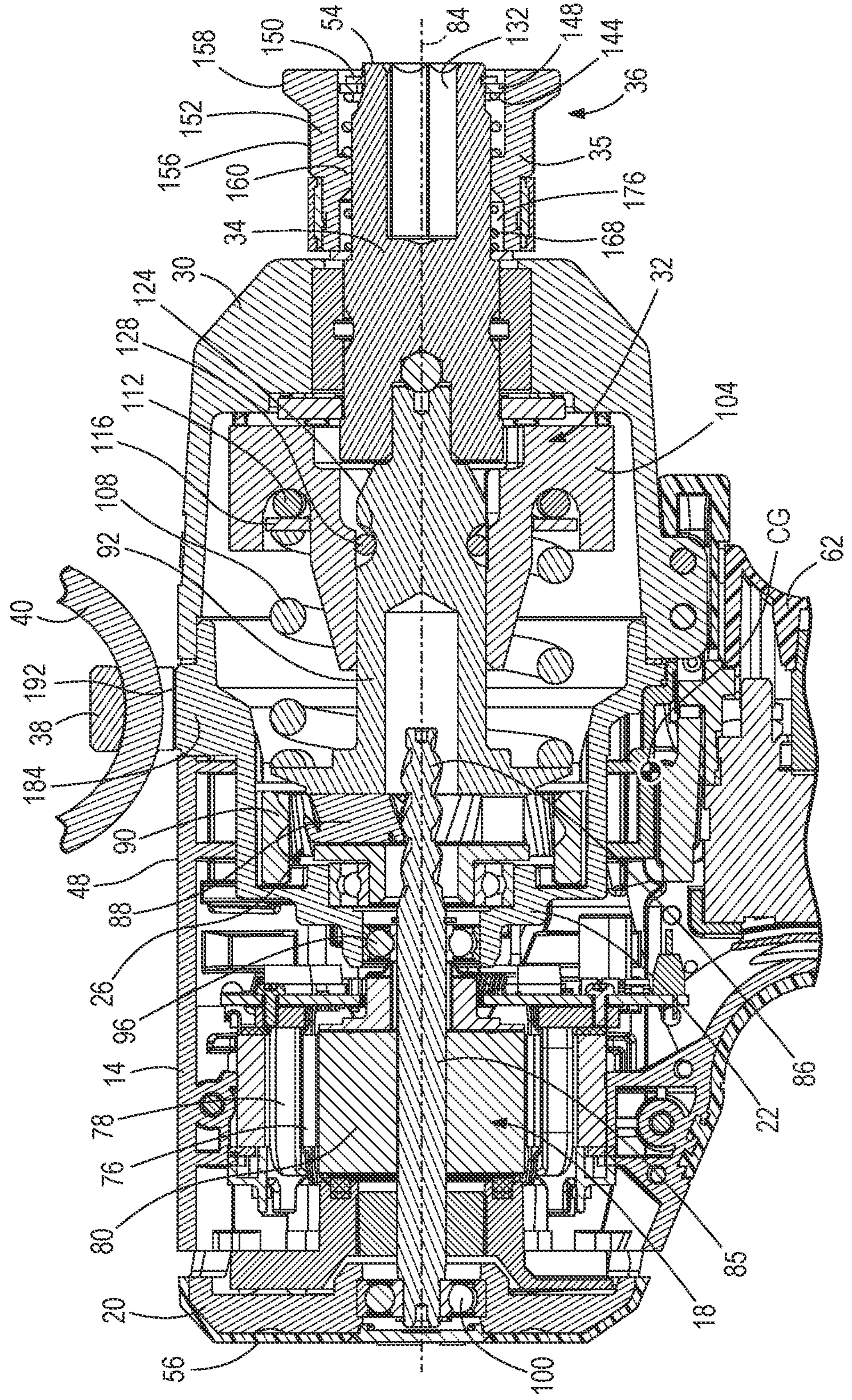
FIG. 3 is a partial cross-sectional view of the impact driver of FIG. 1.

FIGS. 1-3 illustrate a power tool in the form of a rotary impact tool or impact driver 10. The impact driver 10 includes a motor housing 14 in which an electric motor 18 is supported (FIG. 3), an end cap 20 coupled to a rear end of the motor housing 14, a gear case 22 at least partially housing a gear train 26, and an impact housing 30 housing an impact mechanism 32. The gear train 26 and impact mechanism 32 are part of a drive assembly 33 for converting a continuous torque input from the motor 18 to consecutive rotational impacts upon a workpiece, as described in further detail below.

Figure 4:
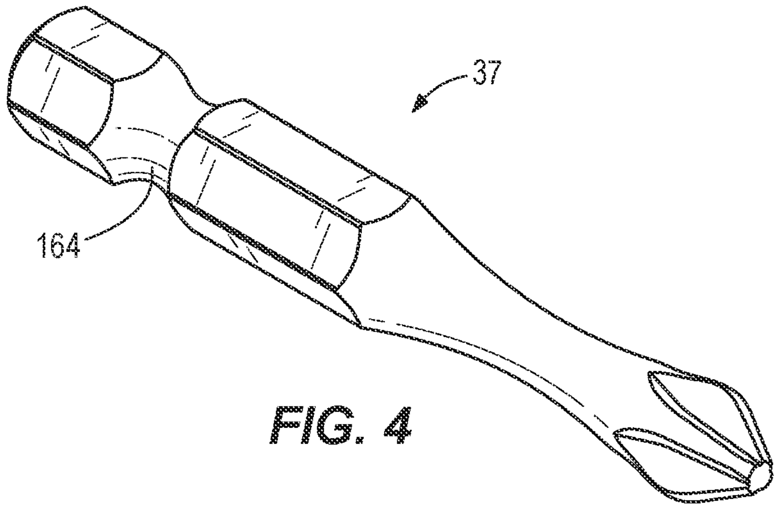
FIG. 4 is a perspective view of a tool bit for use with the impact driver of FIG. 1.

The impact mechanism 32 includes an anvil 34 upon which a quick-release collar 35 of a bit retention assembly 36 is supported, which facilitates retention and removal of a tool bit 37 (FIG. 4) from the anvil 34, as described in further detail below. As also described in further detail below and shown in FIG. 3, the gear train 26 transfers torque from the motor 18 to the impact mechanism 32, which transfers torque to the tool bit 37 retained within the anvil 34. As shown in FIGS. 1 and 2, the impact driver 10 further includes a bracket 38 that is removably mounted to the gear case 22 to secure a support member, such as a ring 40, to the impact driver 10, as described in further detail below.

With reference to FIGS. 1 and 2, the impact driver 10 also includes a handle 42 having a first end 39 coupled to the motor housing 14 and a second end 41 extending away from the motor housing 14. The second end 41 includes a foot 43 having a battery receptacle 44 that receives a battery pack 46. As shown in FIG. 2, the motor housing 14 defines the top 48 of the impact driver 10, and when the battery pack 46 is coupled to the battery receptacle 44, the battery 46 defines the bottom 50 of the impact power driver 10, such that an overall height H1 of the impact driver 10 (excluding the bracket 38 and ring 40) is defined between the top 48 and bottom 50 of the impact driver 10. A distal end of the anvil 34 defines the front 54 of the impact driver 10 and the end cap 38 defines the rear 56 of the impact driver 10, such that an overall length L is defined between the front 54 and rear 56 of the impact driver 10.

In some embodiments, the overall height H1 is 250 mm and the overall length L is 203 mm, such that a ratio of the overall length L to the overall height H is 0.81. Because the ratio of overall length L to overall height H is less than 1, the impact driver 10 is easier to hold and manipulate by an operator because when the operator is grasping the handle 42, the operator's hand is proximate a center of gravity CG (FIGS. 2 and 3) of the impact driver 10. Thus, the moment created by the center of gravity CG while the impact driver 10 is being held is reduced, improving the operator's control and comfort while using the impact driver 10.

With continued reference to FIG. 2, the handle 42 includes a rear side 60 and a trigger 62 that selectively electrically connects the motor 18 and the battery pack 46 to provide DC power to the motor 18 when the battery pack 46 is attached to the battery receptacle 44. The trigger 62 has a front side 64 and a bottom lip 66 that is in facing relationship with the foot 43. A minimum "trigger to back handle" distance D1 is defined between the rear side 60 of the handle 42 and the front side 64 of the trigger 62. A handle height H2 is defined between the bottom lip 66 of the trigger 62 and a top surface 72 of the foot 43. In some embodiments, the handle height H2 is 87 mm, such that a ratio of the handle height H2 to the overall height H1 is 0.34. With the ratio of the handle height H2 to the overall height H1 being greater than 0.3, the impact driver 10 is easier to manipulate because the handle 42 accounts for nearly a third or greater than a third of the overall height H1. In some embodiments, the trigger to back handle distance D1 is 63 mm or less, making the impact driver 10 more user friendly for operators with smaller hands.

Figure 5:
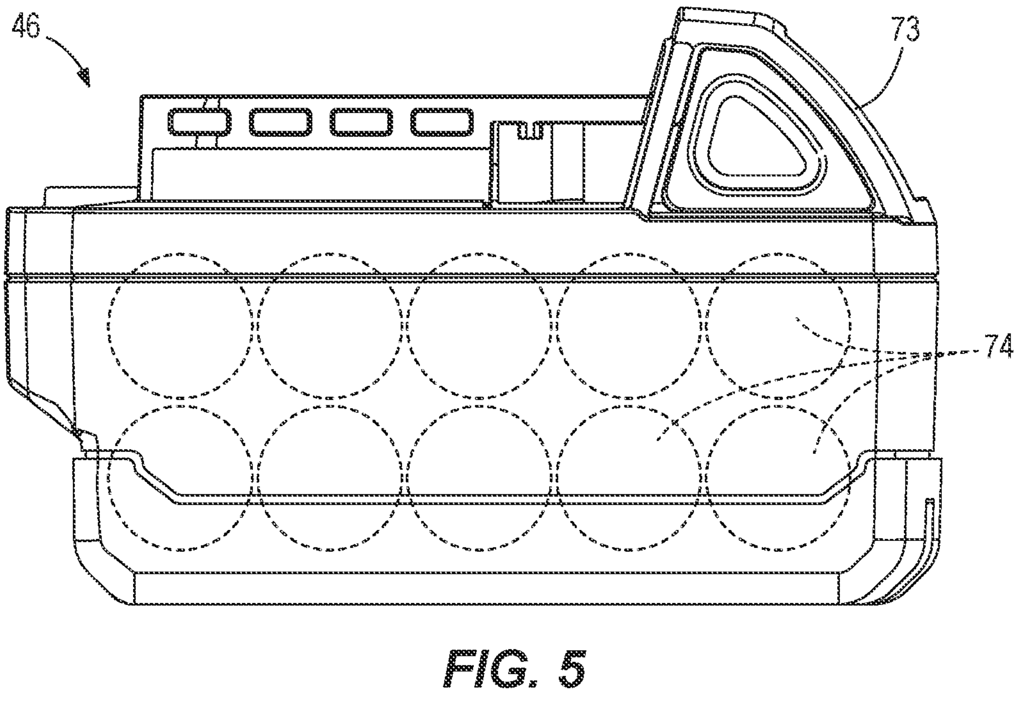
FIG. 5 is a cross-sectional view of a battery pack for use with the impact driver of FIG. 1.
Figure 6:
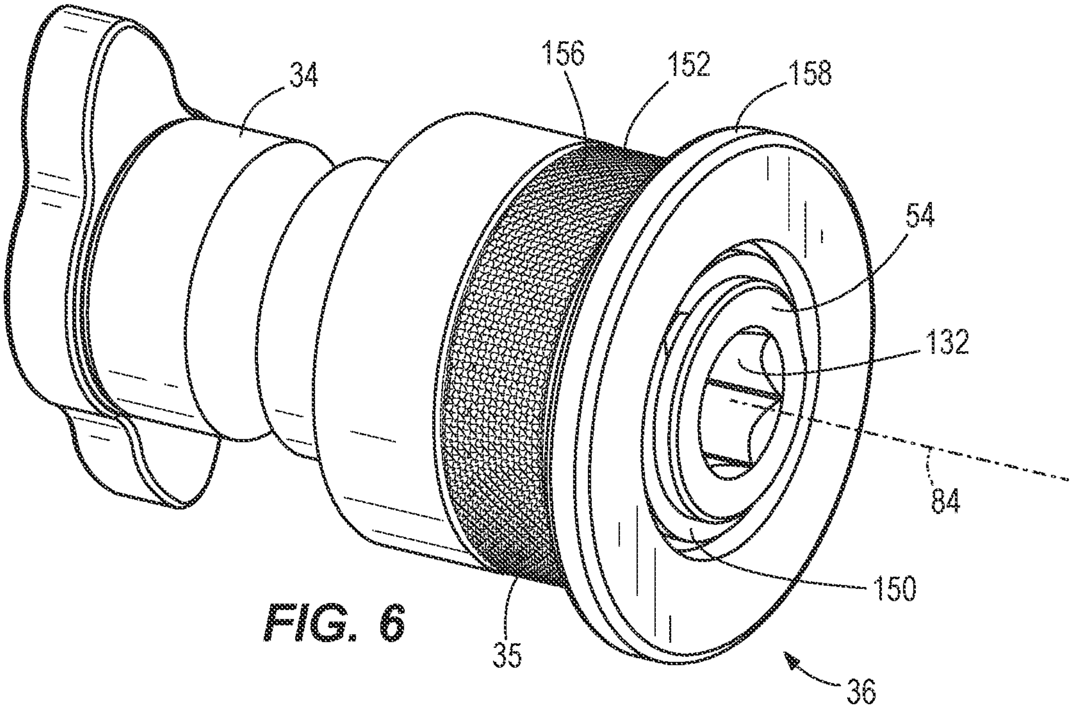
FIG. 6 is a perspective view of a bit retention assembly of the impact driver of FIG. 1.

As shown in FIG. 5, the battery pack 46 includes a housing 73 enclosing a plurality of battery cells 74 that are electrically connected to provide the desired output (e.g., nominal voltage, current capacity, etc.) of the battery pack 46. Each battery cell 74 may have a nominal voltage between about 3 Volts (V) and about 5 V. The battery pack 46 is rechargeable, and the cells may have a Lithium-based chemistry (e.g., Lithium, Lithium-ion, etc.) or any other suitable chemistry. The battery pack 46 has a nominal output voltage of at least 18 V and a nominal capacity of at least 5 Amp-hours (Ah) (e.g., with two strings of five series-connected battery cells (a "5S2P" pack)). In other embodiments, the impact driver 10 may utilize a battery pack that has a nominal capacity of at least 9 Ah (e.g., with three strings of five series-connected battery cells (a "5S3P pack").

The motor 18, supported within the motor housing 14, receives power from the battery pack 46 when the battery pack 46 is coupled to the battery receptacle 44 (FIG. 2). The motor 18 is preferably a brushless direct current ("BLDC") motor with a stator 76 that has a plurality of stator windings 78 (FIG. 3). The motor 18 also includes a rotor 80 having a plurality of permanent magnets (not shown). The stator 76 has a nominal diameter of at least 60 mm and the stator 76 has a stack length of at least 18 mm. For example, in one embodiment, the motor 18 is a BL60-18 motor having a nominal diameter of 60 mm and a stack length of 18 mm. The motor 18 has an approximate peak power of 950 Watts when powered by the 5 Ah battery pack 46 (the 5S2P pack).

The rotor 80 is rotatable about an axis 84 and includes a motor output shaft 85 for driving the gear train 26, and the impact mechanism 32 is coupled to an output of the gear train 26. The gear train 26 may be configured in any of a number of different ways to provide a speed reduction between the output shaft 85 and an input of the impact mechanism 32. With reference to FIG. 3, the illustrated gear train 26 includes a helical pinion 86 formed on the motor output shaft 85, a plurality of helical planet gears 88 meshed with the helical pinion 86, and a helical ring gear 90 meshed with the planet gears 88 and rotationally fixed within the gear case 22. The planet gears 88 are mounted on a camshaft 92 of the impact mechanism 32 such that the camshaft 92 functions as a planet carrier. Accordingly, rotation of the output shaft 85 rotates the planet gears 88, which then rotate along the inner circumference of the ring gear 90 and thereby rotate the camshaft 92. The output shaft 85 is rotatably supported by a first or forward bearing 96 and a second or rear bearing 100 that is supported by the end cap 20.

The impact mechanism 32 of the impact driver 10 will now be described with reference to FIG. 3. The impact mechanism 32 includes the anvil 34, which extends from the impact housing 30. As noted above, the tool bit 37 can be coupled to the anvil 34 for performing work on a workpiece (e.g., a fastener). The impact mechanism 32 is configured to convert the continuous rotational force or torque provided by the motor 18 and gear train 26 to a striking rotational force or intermittent applications of torque to the anvil 34 when the reaction torque on the anvil 34 (e.g., due to engagement between the tool element and a fastener being worked upon) exceeds a certain threshold. In the illustrated embodiment of the impact driver 10, the impact mechanism 32 includes the camshaft 92, a hammer 104 supported on and axially slidable relative to the camshaft 92, and the anvil 34.

Figure 7:
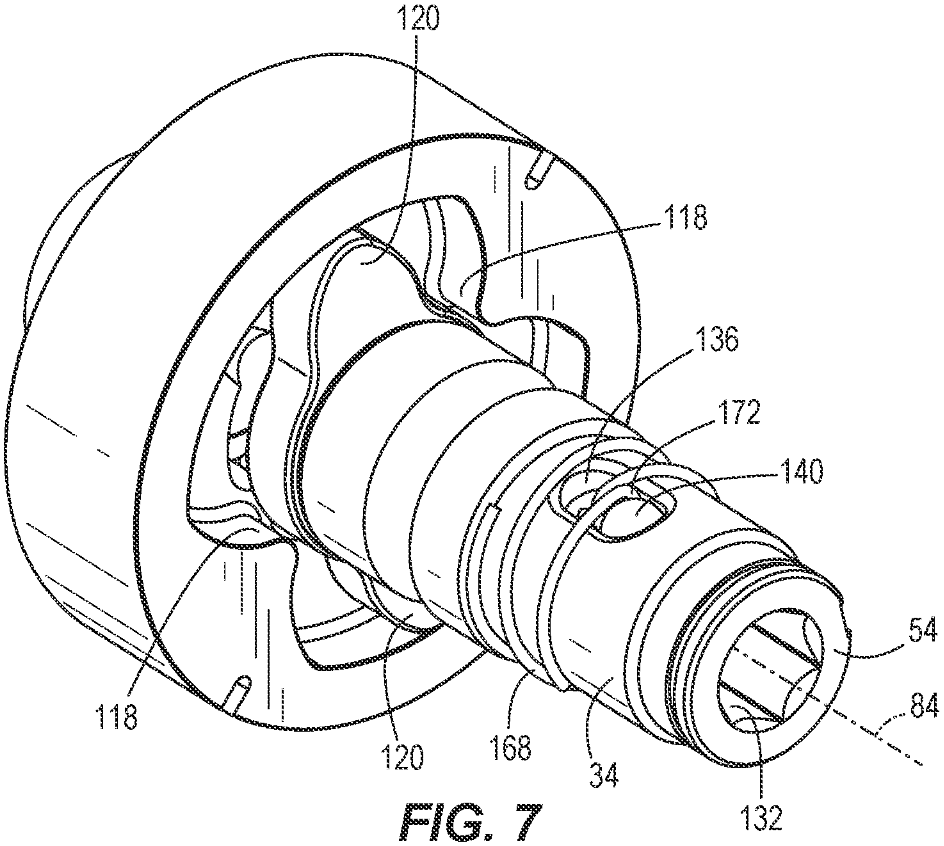
FIG. 7 is an enlarged perspective view of the impact driver of FIG. 1, with portions removed.
Figure 9:
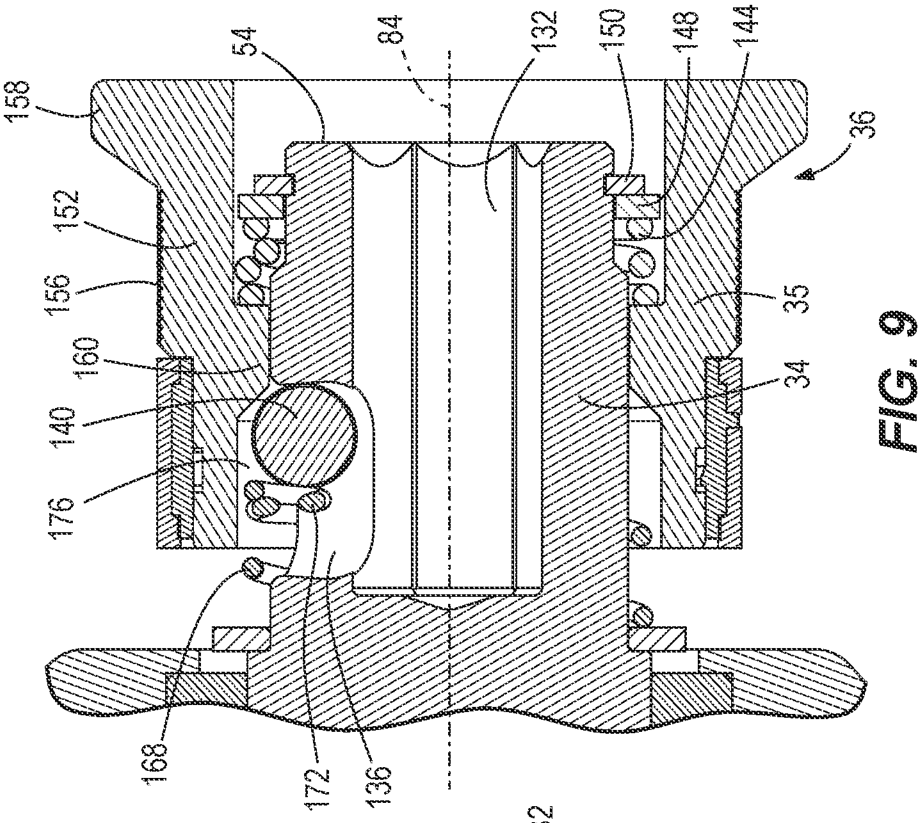
FIG. 9 is a cross-sectional view of the bit retention assembly of FIG. 6, with the collar in a second collar position.
Figure 8:
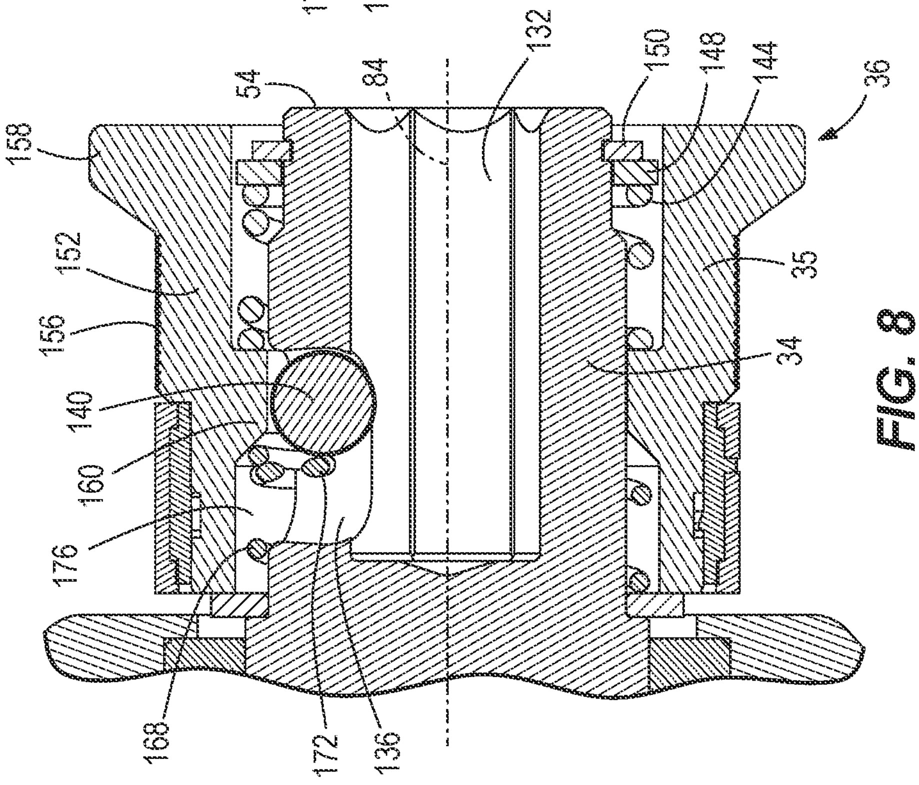
FIG. 8 is a cross-sectional view of the bit retention assembly of FIG. 6, with a collar in a first collar position.

The impact mechanism 32 further includes a hammer spring 108 biasing the hammer 104 toward the front of the impact driver 10 (i.e., toward the right in FIG. 3). In other words, the hammer spring 108 biases the hammer 104 in an axial direction toward the anvil 34, along the axis 84. A thrust bearing 112 and a thrust washer 116 are positioned between the hammer spring 108 and the hammer 104. The thrust bearing 112 and the thrust washer 116 allow for the hammer spring 108 and the camshaft 92 to continue to rotate relative to the hammer 104 after each impact strike when lugs 118 (FIG. 7) on the hammer 104 engage with corresponding anvil lugs 120 and rotation of the hammer 104 momentarily stops.

The camshaft 92 further includes cam grooves 124 in which corresponding cam balls 128 are received (FIG. 3). The cam balls 128 are in driving engagement with the hammer 104 such that movement of the cam balls 128 within the cam grooves 124 allows for relative axial movement of the hammer 104 along the camshaft 92 when the hammer lugs 118 and the anvil lugs 120 are engaged, rotation of the anvil 34 is seized, and the camshaft 92 continues to rotate.

In other embodiments (not shown), the impact mechanism includes a cylinder coupled to the electric motor 18 to receive torque therefrom, causing the cylinder to rotate. The cylinder at least partially defines a chamber that contains an incompressible fluid (e.g., hydraulic fluid, oil, etc.). The hydraulic fluid in the chamber reduces the wear and the noise of the impact assembly that is created by impacting the hammer and the anvil. The hammer and anvil are both positioned at least partially within the chamber. The hammer includes an aperture to permit the hydraulic fluid in the chamber to pass through the hammer. A hammer spring biases the hammer toward the anvil. Such an impact mechanism is described in U.S. Provisional Patent Application No. 62/699,911, filed on Jul. 18, 2018, the entire contents of which is incorporated herein by reference.

Figure 11:
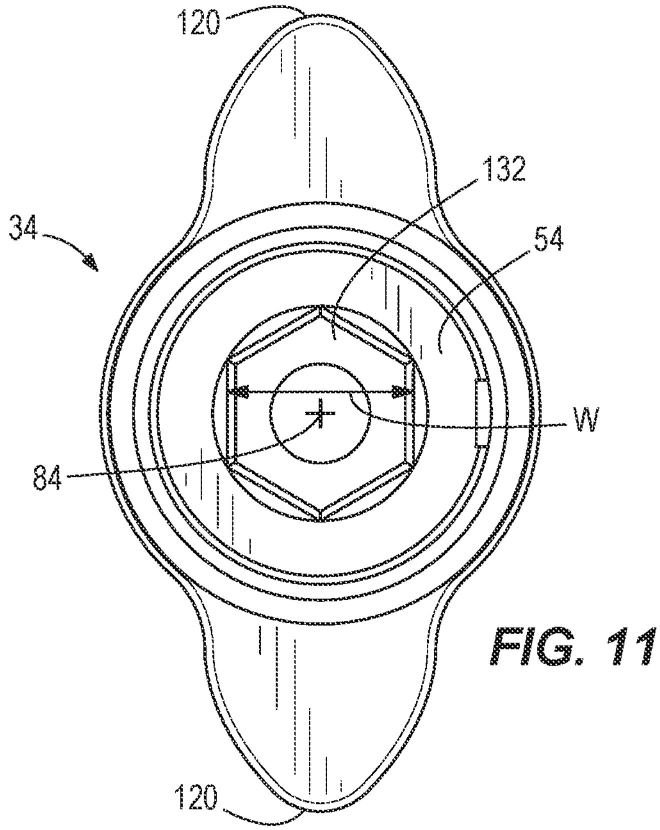
FIG. 11 is an enlarged plan view of an anvil of the impact driver of FIG. 1.

The bit retention assembly 36 of the impact driver 10 will now be described with reference to FIGS. 6-9. Specifically, the distal end of the anvil 34 includes a longitudinal bore 132 in which the tool bit 37 is receivable. As shown in FIG. 11, the bore 132 has a hexagonal cross-sectional shape in a plane oriented transverse to the axis 84, and has a nominal width 134 of 7⁄16 inches to receive the tool bit 37, which has a corresponding nominal width of 7⁄16 inches. The anvil 34 also includes a single radial slot 136 that extends from the longitudinal bore 132 through the anvil 34. The bit retention assembly 36 includes a ball detent 140 received in the radial slot 136, the collar 35 slidably disposed on the anvil 34, a collar spring 144 that biases the collar 35 in a rearward direction to a first collar position (FIGS. 1-3, 6, and 8), and a washer 148 and retaining ring 150 that maintain the collar spring 144 on the anvil 34. The collar 35 includes a body portion 152 including knurling 156 on an outer surface thereof. The collar 35 also includes an annular lip 158 arranged on a distal end of the collar 35 that is farthest from the impact housing 30. The lip 158 extends away from body portion 152 and the axis 84 so as to form a flared portion of the collar 35.

The collar 35 also includes an interior ring 160 having an inner diameter sized to maintain at least a portion of the ball detent 140 within the longitudinal bore 132 which, in turn, is received within a circumferential groove 164 of the tool bit 37 (FIG. 4) to secure the tool bit 37 within the anvil 34. The bit retention assembly 14 also includes a detent spring 168 positioned around the anvil 34. A U-shaped finger 172 of the detent spring 168 is received within the slot 136 for biasing the ball detent 140 toward the front of the slot 136 and toward the open end of the longitudinal bore 18. The collar 35 is moveable along the anvil 34 between the first collar position (FIGS. 1-3, 6, and 8) and a second collar position (FIG. 9), in which the collar 35 is pulled forwardly along the anvil 34 against the bias of the collar spring 144 until the interior ring 160 moves forward of the ball detent 140, such that a recess 176 rearward of the interior ring 160 is axially aligned with the ball detent 140.

In operation, to secure the tool bit 37 within the anvil 34, while the collar 35 is in the first collar position, an operator needs only to insert the end of the tool bit 37 having the circumferential groove 164 within the longitudinal bore 132 and push the tool bit 37 toward the ball detent 140. Continued insertion of the tool bit 37 causes the tool bit 37 to engage the ball detent 140 and push the ball detent 140 rearward against the bias of the detent spring 168. After the ball detent 140 is pushed far enough to clear the interior ring 160 on the collar 35, the ball detent 140 is pushed radially outwardly in the slot 136 and into the recess 176 by the tool bit 37. The tool bit 37 may then slide under the ball detent 140) until the ball detent 140 is received within the circumferential groove 164 in the tool bit 37, at which time the detent spring 168 at least partially rebounds to push the ball detent 140) underneath the interior ring 160. Since the collar 35 is not required to be moved to the second collar position to secure the tool bit 37 within the anvil 34, the operator of the impact driver 10 needs only to use a single hand to insert and secure the tool bit 37 within the anvil 34.

To release the tool bit 37, the operator may grasp the knurling 156 on the body portion 152 and/or the lip 158 of the collar 35 to move the collar 35 from the first collar position to the second collar position, such that the recess 176 is axially aligned with the ball detent 140. The tool bit 37 may then be pulled from the anvil 34, during which time the tool bit 37 forces the ball detent 140 to displace radially outwardly into the recess 176. Once the tool bit 37 has moved passed the ball detent 140, the detent spring 168 at least partially rebounds to push the ball detent 140 underneath the interior ring 160. The operator may then release the collar 35, allowing the collar spring 144 to return the collar 35 to the first collar position. The knurling 156 enhances the operator's grip on the collar 35 by permitting more friction to be developed between the collar 35 and the operator's fingers when grasping the collar 35. Similarly, the lip 158 facilitates the operator's grasp the collar 35 for moving it from the first collar position to the second collar position because the lip 158 provides a flared portion against which the operator can apply force in a direction parallel to the axis 84.

Figure 10:
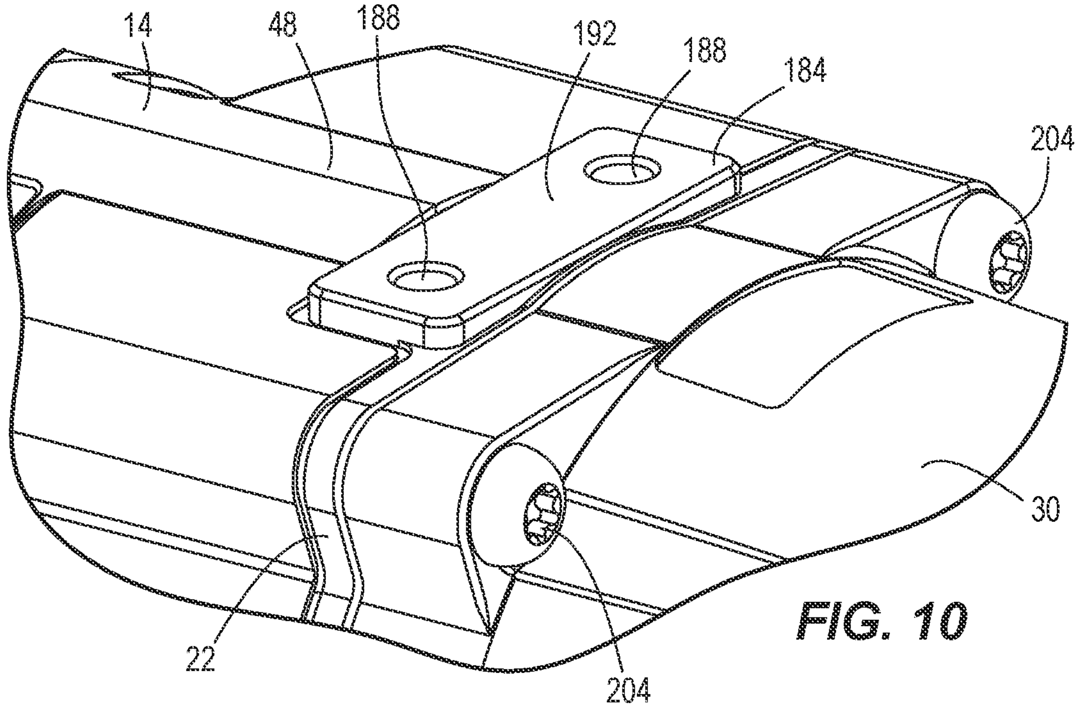
FIG. 10 is an enlarged perspective view of the impact driver of FIG. 1, with a bracket and ring removed.

As noted above, the bracket 38 is removably mounted to the gear case 22 to secure the ring 40 to the impact driver 10. With reference to FIGS. 3 and 10, the gear case 22 includes an upwardly-extending mounting portion 184 that is arranged between the motor housing 14 and the impact housing 30. The mounting portion 184 includes a pair of mounting bores 188 extending through a mounting surface 192. The mounting portion 184 protrudes radially through the motor housing 14 such that the bores 188 are exposed to the exterior of the impact driver 10. As shown in FIGS. 1 and 2, the bracket 38 can be removably coupled to the mounting portion 184 via a pair of bracket fasteners 196. Before fastening the bracket 38 to the mounting portion 184, the ring 40 can be arranged between the bracket 38 and the mounting surface 192. The ring 40 is configured to receive a lanyard 200 (FIG. 1) that is attached to a user's belt, for example, to tether the impact driver 10 to the user. As such, the lanyard 200, ring 40, and bracket 38 will cooperate to prevent the impact driver 10 from hitting the ground if dropped by the operator. The ring 40 is configured to pivot within the bracket 38, providing flexibility in how the lanyard 200 tethers the impact driver 10 to the operator.

As shown in FIG. 1, four housing fasteners 204 extend respectively, in the following order, through each of the impact housing 30, the gear case 22, and the motor housing 14, starting through the impact housing 30 and terminating in the motor housing 14. In this manner, the motor housing 14 is coupled to the impact housing 30 and the gear case 22 is secured (i.e., clamped) between the motor housing 14 and the impact housing 30. Because the bracket 38 is secured to the mounting portion 184 with only the bracket fasteners 196, removal of the housing fasteners 204 that join the motor housing 14 and gear case 22 to the impact housing 30 is not required to remove the bracket 38 from the mounting portion 184. This arrangement thus affords the operator greater convenience when removing the bracket 38 to service or remove the ring 40. Also, because the bracket 38 is not secured to the impact driver 10 via the housing fasteners 204, the bracket 38 is more easily shared across different tools having an arrangement of mounting bores that are similar to the arrangement of the mounting bores 188 of the mounting portion 184.

In operation of the impact driver 10, the operator first inserts the tool bit 37 into the anvil 36, as described above. The operator then depresses the trigger switch 62 to activate the motor 18, which continuously drives the gear train 26 and the camshaft 92 via the output shaft 85. As the camshaft 92 rotates, the cam balls 128 drive the hammer 104 to co-rotate with the camshaft 92, and the hammer lugs 118 engage, respectively, driven surfaces of the anvil lugs 120 to provide an impact and to rotatably drive the anvil 34 and the tool bit 37. After each impact, the hammer 104 moves or slides rearward along the camshaft 92, away from the anvil 34, so that the hammer lugs 118 disengage the anvil lugs 120. The hammer spring 108 stores some of the rearward energy of the hammer 104 to provide a return mechanism for the hammer 104. After the hammer lugs 118 disengage the respective anvil lugs 120, the hammer 104 continues to rotate and moves or slides forwardly, toward the anvil 34, as the hammer spring 108 releases its stored energy, until the drive surfaces of the hammer lugs 118 re-engage the driven surfaces of the anvil lugs 120 to cause another impact. As defined herein, “impact frequency” means the number of impacts imparted by the hammer 104 upon the anvil 34 per unit time, measured in “impacts per minute.” Once finished with the impact driving operation, the operator may remove the tool bit 37 from the anvil 34, as described above.

During operation of the impact driver 10 under a no-load condition, when the anvil 34 is not being used to apply torque to a fastener, the co-rotation of the camshaft 92, the hammer 104, and the anvil 34 define an “output speed” of the impact driver 10 measured in revolutions per minute.

The impact driver 10 has a weight of 5.9 pounds, the 5 Ah battery pack 46 (the 5S2P pack) has a weight of 1.55 pounds, and the 9 Ah battery pack (5S3P) has a weight of 2.4 pounds. Thus, when the 5 Ah battery pack 46 is coupled to the impact driver 10, the impact driver 10 has an overall weight of 7.45 pounds, and when the 9 Ah battery pack is coupled to the impact driver 10, the impact driver 10 has an overall weight of 8.3 pounds. As defined herein, the term “fastening torque” means torque applied to a fastener in a direction increasing tension (i.e. in a tightening direction).

The first and second rows of TABLE 1 below list the overall weight, the peak output speed, the peak fastening torque, and the peak impact frequency (measured in impacts per minute) achieved by known prior art 7⁄16 inch impact wrenches that use a 5 Ah battery pack. The third and fourth rows of TABLE 1 below list the peak output speed, the peak fastening torque, and the peak impact frequency achieved by the impact driver 10 when respectively using the battery pack 46 (the 5S2P pack—5 Ah) or the 5S3P (9 Ah) battery pack. The peak fastening torque is measured by fastening a 1¼" zinc plated, Grade 8 bolt. TABLE 1 below also lists the ratios of peak output speed to overall weight, calculated by dividing peak output speed by the overall weight. TABLE 1 below also lists the ratio of peak fastening torque to overall weight, calculated by dividing the peak fastening torque by the overall weight. TABLE 1 below also lists the ratio of peak impact frequency to the overall weight, calculated by dividing the peak impact frequency by the overall weight.

TABLE 1

| | Overall Weight (pounds) | Peak Output Speed (revolutions per minute) | Peak Fastening Torque (ft-lbs) | Peak Impact Frequency (impacts per minute) | Ratio of Peak Output Speed to Overall Weight (revolution per minute per pound) | Ratio of Peak Fastening Torque to Overall Weight (ft-lbs per pound) | Ratio of Peak Impact Frequency to Overall Weight (impacts per minute per pound) |
|---|---|---|---|---|---|---|---|
| First prior art impact wrench | 7.6 | 1,900 | 973 | 2,400 | 250.0 | 128.0 | 315.8 |
| Second prior art impact wrench | 8.2 | 1,800 | 1,054 | 2,200 | 219.5 | 128.5 | 268.3 |
| Impact driver 10 with 5 Ah battery pack 46 | 7.45 | 2,420 | 920 | 2,858 | 324.8 | 123.5 | 383.6 |
| Impact driver 10 with 9 Ah battery pack | 8.3 | NA | 986 | NA | NA | 118.7 | NA |

As shown in TABLE 1, when using the 5 Ah battery pack 46, and with a motor 18 capable of generating approximately 950 Watts of power with a stator 76 having a nominal diameter of only 60 mm and a stack length of only 18 mm, the impact driver 10 is capable of achieving a higher ratio of peak output speed to overall weight than either of the prior art impact wrenches while having a lower overall weight than either of the prior art impact wrenches.

Also, as shown in TABLE 1, when using the 5 Ah battery pack 46, and with a motor 18 capable of generating approximately 950 Watts of power with a stator 76 having a nominal diameter of only 60 mm and a stack length of only 18 mm, the impact driver 10 achieves nearly the same ratio of peak fastening torque to overall weight as the prior art impact wrenches, while having a lower overall weight than the prior art impact wrenches. Therefore, on a per-unit weight basis, the impact driver 10 approximately matches the fastening torque performance of the heavier prior art impact wrenches.

Further, as shown in TABLE 1, when using the 5 Ah battery pack 46, and with a motor 18 capable of generating approximately 950 Watts of power with a stator 76 having a nominal diameter of only 60 mm and a stack length of only 18 mm, the impact driver 10 achieves a higher ratio of impact frequency to overall weight than the prior art impact wrenches, while having a lower overall weight than the prior art impact wrenches. Thus, the impact driver 10 provides an operator with a lighter weight rotary impact tool for jobs while still achieving the nearly the same or better fastening performance characteristics than other known prior art 7/16-inch impact wrenches.

As used herein, the term "mechanism efficiency" ("na") represents how well an impact driver produces work per unit of time per input unit of power. The mechanism efficiency is determined by multiplying the impact frequency, measured in impacts per minute ("BPM") by the kinetic energy of the hammer 104 during a loaded condition and prior to impact with the anvil 34 ("$KE_{Hammer,Drilling}$", measured in Joules) divided by current drawn by the motor 18 ("$Current_{motor}$", measured in Amperes) and the voltage across the motor 18 ("$Voltage_{motor}$", measured in Volts), as shown in the below equation:

$$\eta_a = \frac{BPM \times KE_{Hammer,Drilling}}{\text{Voltage}_{motor} \times \text{Current}_{motor}}$$

When using the 5 Ah battery pack 46, and with a motor 18 capable of generating approximately 950 Watts of power with a stator 76 having a nominal diameter of only 60 mm and a stack length of only 18 mm, the impact driver 10 is capable of achieving a variety of advantageous performance ratios, as described below.

For example, a first performance ratio ("$PR_1$") measures the efficiency of the impact mechanism 32 per unit of inertia of the hammer 104. The first performance ratio is determined by dividing the mechanism efficiency by the moment of inertia of the hammer 104 ("$Inertia_{hammer}$", measured in kg-$m^2$) and a scaler of 216,000, as shown in the below equation:

$$PR_1 = \left(\frac{\eta_a}{\text{Inertia}_{hammer}}\right) \times \left(\frac{1}{216{,}000}\right)$$

The scaler of 1/216,000 is used to reduce the first performance ratio to a manageable number of significant digits (e.g., three, as shown in Table 2 below). However, other scalers could be used.

A second performance ratio ("$PR_2$") measures the ability of the impact mechanism 32 to maintain the level at which it's performing work during a transition from a no-load state to a loaded state, per unit of inertia of the hammer 104. Specifically, the second performance ratio is determined by multiplying the mechanism efficiency times the rotational frequency, measured in revolutions per minute, of the impact mechanism 32 under a no-load condition ("$RPM_{no\text{-}load}$") divided by the moment of inertia of the hammer 104 and a scaler of 216,000,000, as shown in the below equation:

$$PR_2 = \left(\frac{\eta_a \times RPM_{no\text{-}load}}{\text{Inertia}_{hammer}}\right) \times \left(\frac{1}{216{,}000{,}000}\right)$$

The scaler of 1/216,000,000 is used to reduce the second performance ratio to a manageable number of significant digits (e.g., three, as shown in Table 2 below). However, other scalers could be used.

A third performance ratio ("$PR_3$") measures the efficiency of the impact mechanism 32 per unit of mass of the hammer 104. The third performance ratio is determined by dividing the mechanism efficiency by the mass of the hammer 104 ("Mass hammer", measured in kg) and a scaler of 60, as shown in the below equation:

$$PR_3 = \left(\frac{\eta_a}{\text{Mass}_{hammer}}\right) \times \left(\frac{1}{60}\right)$$

The scaler of 1/60 is used to reduce the third performance ratio to a manageable number of significant digits (e.g., three, as shown in Table 2 below). However, other scalers could be used.

A fourth performance ratio ("$PR_4$") measures the ability of the impact mechanism 32 to maintain the level at which it's performing work during a transition from a no-load state to a loaded state, per unit of mass of the hammer 104. Specifically, the fourth performance ratio is determined by multiplying the mechanism efficiency times the rotational frequency, measured in revolutions per minute, of the impact mechanism 32 under a no-load condition divided by the mass of the hammer 104 and a scaler of 3600, as shown in the below equation:

$$PR_4 = \left(\frac{\eta_a \times RPM_{no\text{-}load}}{\text{Mass}_{hammer}}\right) \times \left(\frac{1}{3{,}600}\right)$$

The scaler of 1/3,600 is used to reduce the third performance ratio to a manageable number of significant digits (e.g., four, as shown in Table 2 below). However, other scalers could be used.

The first and second rows of TABLE 2 below list values for impact frequency (measured in impacts per minute), hammer kinetic energy (J), voltage (V), current (A), no-load speed (RPM), hammer inertia (kg-s2), hammer mass (kg), as well as the first, second, third, and fourth performance ratios respectively achieved by the first and second prior art 7/16-inch impact wrenches discussed in TABLE 1 above, using a 5 Ah battery pack in a drilling operation. The third row lists the same values for a third prior art 7/16-inch impact wrench using a 5 Ah battery pack in a drilling operation. The fourth and fifth rows of TABLE 2 below list the same values for the impact driver 10 when respectively using the battery pack 46 (the 5S2P pack—5 Ah) or the 5S3P (9 Ah) battery pack.

TABLE 2

| | Impacts per minute | Hammer Kinetic Energy (J) | Voltage (V) | Current (A) | No-Load Speed (RPM) | Hammer Inertia (kg-s$^2$) | Hammer Mass (Kg) | $PR_1$ | $PR_2$ | $PR_3$ | $PR_4$ |
|---|---|---|---|---|---|---|---|---|---|---|---|
| First prior art impact wrench | 2,671 | 14.9 | 19.3 | 44.1 | 1,883 | $2.45 \times 10^{-4}$ | 0.416 | 0.89 | 1.67 | 1.88 | 59.01 |
| Second prior art impact wrench | 2,161 | 17.3 | 19.1 | 49.3 | 1,662 | $4.37 \times 10^{-4}$ | 0.542 | 0.42 | 0.70 | 1.22 | 33.74 |
| Third prior art impact wrench | 2,599 | 11.8 | 19.4 | 39.3 | 1,632 | $2.04 \times 10^{-4}$ | 0.357 | 0.91 | 1.49 | 1.88 | 51.11 |
| Impact driver 10 with 5 Ah battery pack 46 | 3,094 | 14.8 | 18.9 | 58.3 | 2,099 | $1.82 \times 10^{-4}$ | 0.306 | 1.06 | 2.23 | 2.27 | 79.49 |
| Impact driver 10 with 9 Ah battery pack | 3,212 | 16.0 | 18.4 | 62.2 | 2,099 | $1.82 \times 10^{-4}$ | 0.306 | 1.14 | 2.40 | 2.44 | 85.29 |

As can be seen in TABLE 2, as compared with the three prior art 7/16" impact wrenches using a 5 Ah battery pack in a drilling operation, the impact driver 10 with the 5 Ah battery pack 46 is the only 7/16-inch impact driver able to achieve a first performance ratio that is greater than 1, a second performance ratio that is greater than 2, a third performance ratio that is greater than 2, and a fourth performance ratio that is greater than 65. Similarly, the impact driver 10 when using a 9 Ah battery pack in a drilling operation is able to achieve a first performance ratio that is greater than 1, a second performance ratio that is greater than 2, a third performance ratio that is greater than 2, and a fourth performance ratio that is greater than 65.

With respect to the first and third performance ratios, while the three prior art 7/16-inch impact drivers benefit from larger hammers than the impact driver 10 with respect to peak fastening torque (see TABLE 1), they are penalized in evaluation of the first and third performance ratios because the larger hammers also result in a higher moment of inertia. Because the impact driver 10 has a smaller and lighter hammer 104 yet still achieves a comparable mechanism efficiency as the three prior art 7/16-inch impact drivers, it achieves a first performance ratio that is greater than 1 and a third performance ratio that is greater than 2 because the moment of inertia of the hammer 104 is lower (relevant to the first performance ratio) due to the smaller and lighter hammer 104 (relevant to the third performance ratio). Thus, the efficiency of the impact mechanism 32 per unit of inertia of the hammer 104 of the impact driver 10 (first performance ratio) or per unit of mass of the hammer 104 (third performance ratio) is greater than the three prior art 7/16-inch impact drivers.

With respect to the second and fourth performance ratios, impact drivers that have a high no-load speed (at the beginning of an operation) and a high loaded speed (as evaluated by the kinetic energy of the hammer 104 in a loaded state, prior to impact) are favored, because during a drilling or fastening operation, it is advantageous for the impact mechanism 32 to possess both high initial (unloaded) speed and a high speed when in a loaded state (during the operation) that is continued through termination of the operation. Because the impact driver 10 has a smaller hammer 104 yet still achieves a higher no-load speed than the three prior art 7/16-inch impact drivers, it achieves a second performance ratio that is greater than 2 and a fourth performance ratio that is greater than 65. Thus, the impact mechanism 32 of the impact driver 10 is better able to maintain the level at which it's performing work during a transition from a no-load state to a loaded state, per unit of inertia of the hammer 104 (second performance ratio) or per unit of mass of the hammer 104 (fourth performance ratio), compared to the three prior art 7/16-inch impact drivers identified in TABLE 2 above.

The impact driver 10 is particularly effective at drilling operations because it simultaneously achieves a first performance ratio that is greater than 1, a second performance ratio that is greater than 2, a third performance ratio that is greater than 2, and a fourth performance ratio that is greater than 65.

Figure 14:
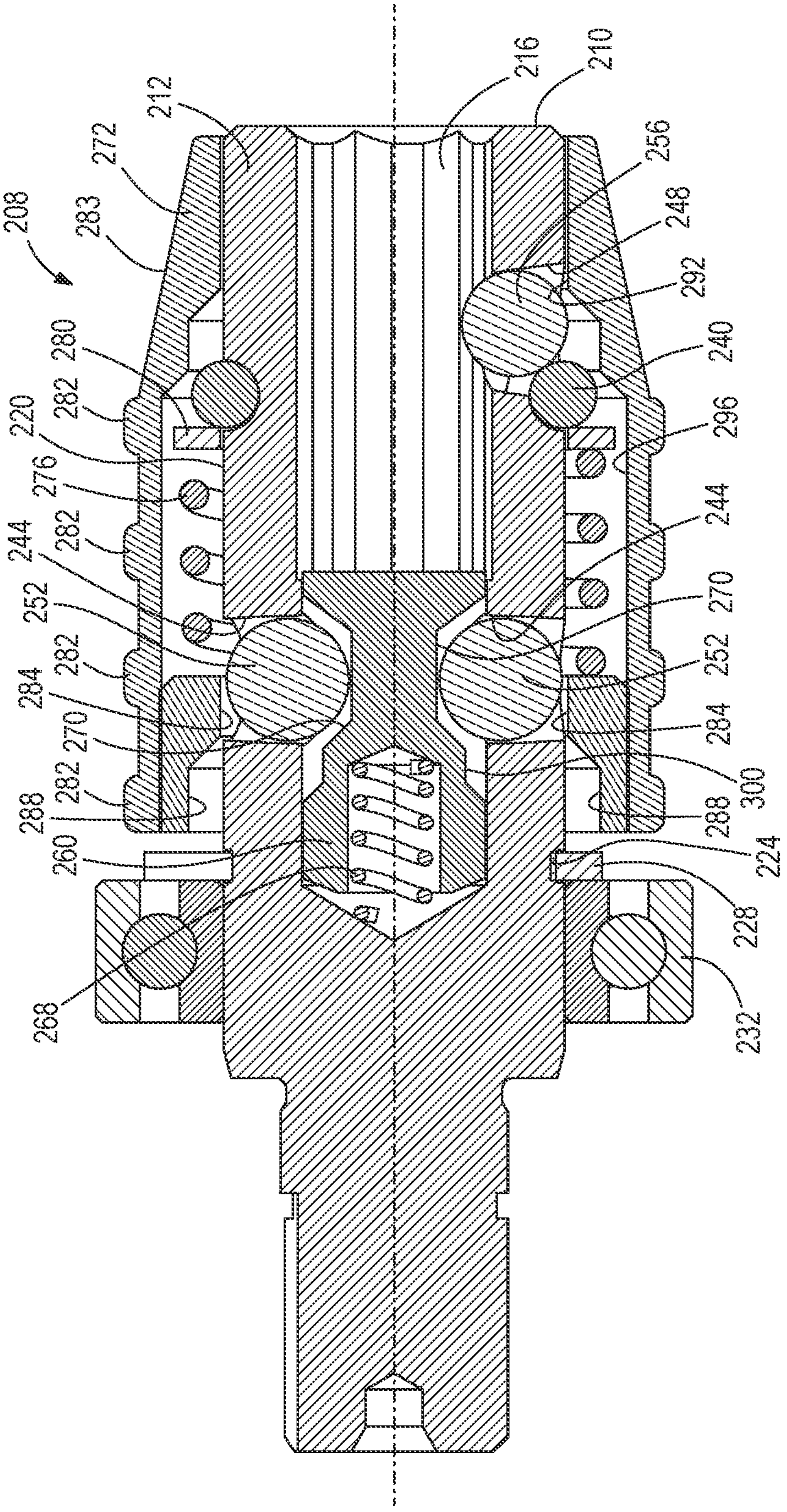
FIG. 14 is a cross-sectional view of the bit retention assembly of FIG. 12 shown in a bit-locking state.
Figure 15:
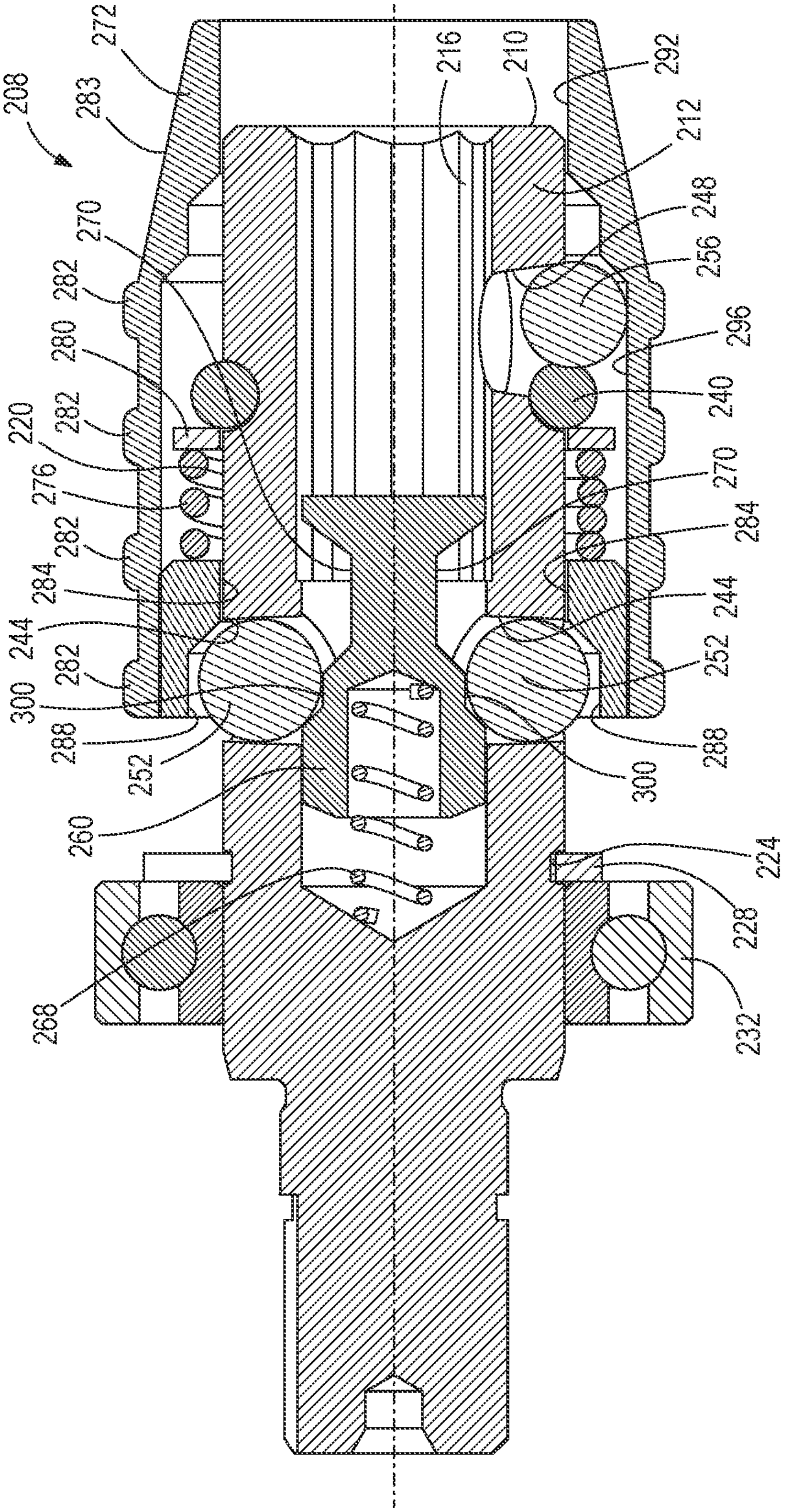
FIG. 15 is a cross-sectional view of the bit retention assembly of FIG. 12 shown in a bit-release state.

An alternative embodiment of a bit retention assembly 208 for the impact driver 10 will now be described with reference to FIGS. 12-15. A distal end 210 of an anvil 212 includes a longitudinal bore 216 in which the tool bit 37 is receivable. Like the bore 132 of the anvil 34, the bore 216 of the anvil 212 has a hexagonal cross-sectional shape in a plane oriented transverse to the axis 84, and has a nominal width of 7/16 inches to receive the tool bit 37. The anvil 212 has an outer surface 220 and a circumferential groove 224 (FIG. 13) for receipt of a clip 228 (FIGS. 14 and 15). A bearing 232 is also arranged on the outer surface 220 for rotatably supporting the anvil 212 within the impact housing 30. In some embodiments, the bearing 232 is press-fit to the anvil 212. The anvil 212 also has a circumferential O-ring groove 236 (FIG. 13) in which an O-ring 240 (FIGS. 14 and 15) is retained.

Figure 13:
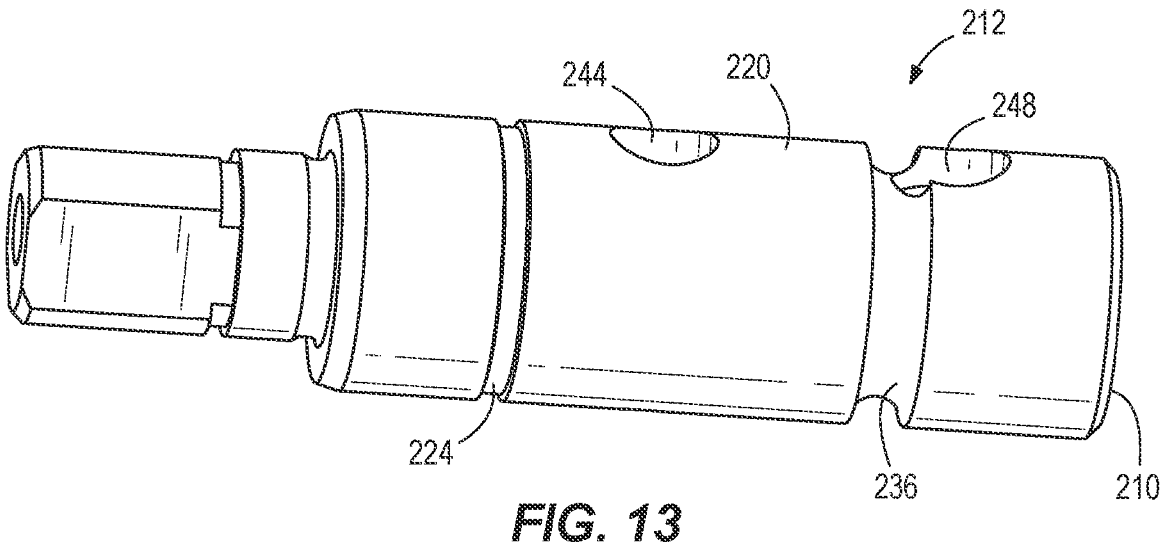
FIG. 13 is a perspective view of another embodiment of an anvil for use with the impact driver of FIG. 1, incorporating features of the bit retention assembly of FIG. 12.

The anvil 212 further includes a pair of radial plunger detent apertures 244 and a radial bit detent aperture 248, all of which extend radially inward from the outer surface 220 to the bore 216 (FIG. 13). The bit detent aperture 248 intersects the O-ring groove 236, such that the O-ring 240 is at least partially arranged in the bit detent aperture 248. As shown in FIGS. 14 and 15, a pair of plunger detents 252 are respectively arranged in the plunger detent apertures 244 and a bit detent 256 is arranged in the bit detent aperture 248. As shown in FIGS. 14 and 15, a plunger 260 is arranged in the bore 216 and is biased toward the distal end 210 of the anvil 212 by a plunger spring 268 that is also arranged in the bore 216. The plunger 260 includes a circumferential plunger detent recess 270).

Figure 12:
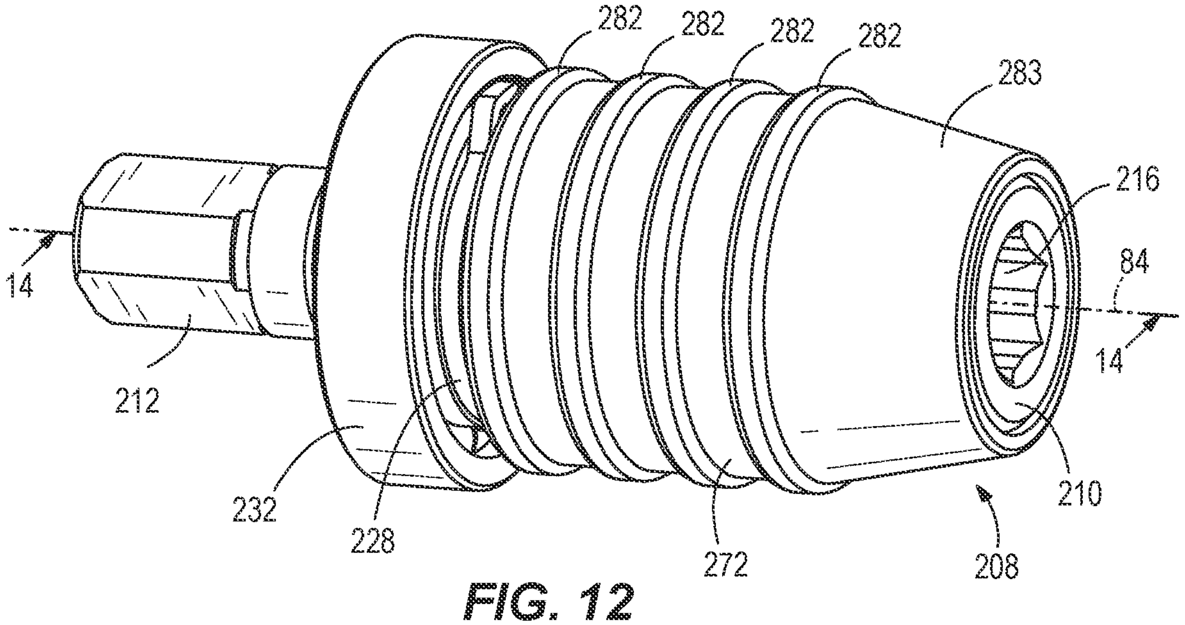
FIG. 12 is a perspective view of another embodiment of a bit retention assembly for use with the impact driver of FIG. 1.

The bit retention assembly 208 includes the O-ring 240, the bit detent 256 received in the bit detent aperture 248, a collar 272 slidably disposed on the anvil 212, a collar spring 276 that biases the collar 272 in a rearward direction to a first collar position (FIGS. 12 and 14), and a washer 280 that maintains the collar spring 276 on the anvil 212. As shown in FIGS. 14 and 15, the washer 280 is arranged between the O-ring 240 and the collar spring 276, with the washer 280 being abutted with the O-ring 240. As shown in FIG. 12, the collar 272 may include ribs 282 on an outer surface 283 thereof to enhance the operator's grip on the collar 272. The clip 228 limits the extent to which the collar spring 276 can push the collar 272 rearward, such that the first position is defined by the collar 272 being abutted against the clip 228, as shown in FIGS. 12 and 14.

The collar 272 includes a first inner plunger detent surface 284 and a second inner plunger detent surface 288 that has a greater diameter than the first inner plunger detent surface 284. The collar 272 also includes a first inner bit detent surface 292 and a second inner bit detent surface 296 that has a greater diameter than the first inner bit detent surface 292. In the first collar position (FIGS. 12 and 14), the first inner plunger detent surface 284 is axially aligned with the plunger detent apertures 244, such that the plunger detents 252 are radially inhibited by the first inner plunger detent surface 284, and the first inner bit detent surface 292 is axially aligned with the bit detent aperture 248. As shown in FIG. 14, when the collar 272 is in the first collar position, the plunger spring 268 is maintained in a compressed state by virtue of the plunger detents 252 being inhibited from moving in a radially outward direction by the first inner plunger detent surface 284. Thus, the plunger detents 252 are maintained in the plunger detent recess 270, keeping the plunger 260 axially loaded against the plunger spring 268.

The collar 272 is moveable along the anvil 212 between the first collar position (FIGS. 12 and 14) and a second collar position (FIG. 15), in which the collar 272 is pulled forwardly along the anvil 212 against the bias of the collar spring 276 until the first inner plunger detent surface 284 is axially forward of the plunger detent apertures 244, the second inner plunger detent surface 288 is axially aligned with the plunger detent apertures 244, the first inner bit detent surface 292 is axially forward of the bit detent aperture 248, and the second inner bit detent surface 296 is axially aligned with the bit detent aperture 248.

In operation, to secure the tool bit 37 within the anvil 212, while the collar 272 is in the second collar position (FIG. 15), an operator needs only to insert the end of the tool bit 37 having the circumferential groove 164 within the longitudinal bore 216 and push the tool bit 37 toward the plunger 260. Continued insertion of the tool bit 37 causes the tool bit 37 to engage the bit detent 256 and push the bit detent 256 radially outward in the bit detent aperture 248 until it abuts the first inner bit detent surface 292, causing the O-ring 240 to elastically deform until the bit detent 256 is pushed out of the longitudinal bore 216. Once the bit detent 256 is pushed out of the longitudinal bore, the tool bit 37 may then slide past the bit detent 256 until the bit detent 256 is axially aligned with the circumferential groove 164 in the tool bit 37, at which time the O-ring 240 elastically recovers to push the bit detent 256 into the circumferential groove 164. The tool bit 37 is then locked within the bore 216.

As the tool bit 37 moves rearwardly in the longitudinal bore 216, the tool bit 37 also pushes the plunger 260 rearward, compressing the plunger spring 268, such that the plunger detents 252 become axially aligned with the plunger detent recess 270. The collar spring 276 is thus allowed to push the collar 272 rearward, causing the plunger detents 252 to be pushed into the plunger detent recess 270. The collar spring 276 then continues pushing the collar 272 rearward until the first inner plunger detent surface 284 becomes axially aligned with the plunger detent apertures 244 and the collar 272 is in the first collar position. Since the operator does not need to manually move the collar 272 from the second collar position to the first collar position (FIG. 14) to secure the tool bit 37 within the anvil 212, the operator of the impact driver 10 needs only to use a single hand to insert and secure the tool bit 37 within the anvil 34.

To release the tool bit 37, the operator moves move the collar 272 from the first collar position to the second collar position. The ribs 282 facilitate the operator's grasp on the collar 272 moving it from the first collar position to the second collar position because the ribs 282 provide flared portions against which the operator can apply force in a direction parallel with the axis 84. Movement of the collar 272 to the second collar position causes the second inner plunger detent surface 288 to be axially aligned with the plunger detent apertures 244 and the second inner bit detent surface 296 to be axially aligned with the bit detent aperture 248.

Because the plunger detents 252 are no longer radially constrained by the first inner plunger detent surface 288, the plunger spring 268 is able to rebound, pushing the plunger 260 toward the distal end 210 of the anvil 212, thus causing the plunger detents 252 to be moved radially outward in the plunger detent apertures 244 until they are out of the plunger detent recess 270 and abutting the second inner plunger detent surface 288 of the collar 272. Because the bit detent 256 is no longer radially constrained by the first inner bit detent surface 292, the tool bit 37 is no longer locked within the bore 216 and thus the plunger 260 ejects the tool bit 37 from the bore 216.

As the tool bit 37 is ejected from the bore 216 by the plunger 260, the bit detent 256 is pushed by the tool bit 37 radially outward in the bit detent aperture 248 until it abuts the second inner bit detent surface 296. As the bit detent 256 is pushed radially outward by the tool bit 37, the movement of the bit detent 256, and thus the movement of the tool bit 37 as it is exiting the bore 216, is resisted by the O-ring 240, because the bit detent 256 must frictionally engage the o-ring 240 as it is moved toward the second inner bit detent surface 296. Because the O-ring 240 resists the movement of the tool bit 37 from the bore 216, the tool bit 37 is prevented from suddenly ejecting from the bore 216 when the collar 272 is moved to the second collar position. Thus, it is easier for an operator to grasp or retain the tool bit 37 as it is ejected from the bore 216.

The operator may then release the collar 272. When the collar 272 is released, the collar 272 is maintained in the second position by virtue of the plunger spring 268 keeping the plunger 260 pushed forward, such that the plunger detents 252 are maintained against an intermediate flat 300 of the plunger 260, the diameter of which is greater than the plunger detent recess 270. Thus, the plunger detents 252 are maintained against the second inner plunger detent surface 288 of the collar 272, thereby preventing the collar spring 276 from returning the collar 272 to the first collar position.

The collar 272 is thus maintained in the second collar position, ready for reinsertion of the tool bit 37, as described above.

Various features of the invention are set forth in the following claims.

What is claimed is:

1. A rotary impact tool comprising:

a housing;

an electric motor supported in the housing;

a drive assembly for converting a continuous torque input from the motor to consecutive rotational impacts upon a workpiece, the drive assembly including an anvil having a bore in a distal end thereof for receipt of the workpiece or a tool bit for performing work on the workpiece, the bore defining a hexagonal cross-sectional shape in a plane oriented transverse to a rotational axis of the anvil, the bore having a nominal width of 7/16 inches, a hammer that is both rotationally and axially movable relative to the anvil for imparting the consecutive rotational impacts upon the anvil, and a spring for biasing the hammer in an axial direction toward the anvil;

a battery pack supported by the housing for providing power to the motor, the battery pack having a nominal voltage of at least 18 Volts and a nominal capacity of at least 5 Ah;

wherein the rotary impact tool has an overall weight including the battery pack that is less than or equal to 7.5 lbs, wherein a mechanism efficiency of the rotary impact tool is defined as:

$$\eta_a = \frac{BPM \times KE_{Hammer,Drilling}}{\text{Voltage}_{motor} \times \text{Current}_{motor}},$$

wherein BPM is the number of impacts per minute, $KE_{Hammer,Drilling}$ is a kinetic energy of the hammer during a loaded condition and prior to impact with the anvil, $\text{Voltage}_{motor}$ is a voltage across the motor, and $\text{Current}_{motor}$ is a current drawn by the motor, wherein a second performance ratio ($PR_2$) of the rotary impact tool is defined as:

$$PR_2 = \left(\frac{\eta_a \times RPM_{no-load}}{\text{Inertia}_{hammer}}\right) \times \left(\frac{1}{216{,}000{,}000}\right),$$

wherein $RPM_{no-load}$ is a rotational frequency of the impact mechanism under a no-load condition and $\text{Inertia}_{hammer}$ is a moment of inertia of the hammer, and wherein the second performance ratio of the rotary impact tool is greater than 2.

2. The rotary impact tool of claim 1, wherein a third performance ratio ($PR_3$) of the rotary impact tool is defined as:

$$PR_3 = \left(\frac{\eta_a}{\text{Mass}_{hammer}}\right) \times \left(\frac{1}{60}\right),$$

wherein $\text{Mass}_{hammer}$ is a mass of the hammer, and wherein the third performance ratio of the rotary impact tool is greater than 2.

3. The rotary impact tool of claim 2, wherein a fourth performance ratio ($PR_4$) of the rotary impact tool is defined as:

$$PR_4 = \left(\frac{\eta_a \times RPM_{no-load}}{\text{Mass}_{hammer}}\right) \times \left(\frac{1}{3{,}600}\right),$$

and wherein the fourth performance ratio of the rotary impact tool is greater than 65.

4. The rotary impact tool of claim 1, wherein the motor is a brushless electric motor including a stator having a nominal diameter of 60 mm and a plurality of stator windings, and a rotor positioned within the stator and having a plurality of permanent magnets.

5. The rotary impact tool of claim 1, wherein the drive assembly is configured to convert a continuous torque input from the motor to consecutive rotational impacts upon the workpiece of at least 900 ft-lbs of fastening torque, and wherein a ratio of the fastening torque to the overall weight is greater than or equal to 120 ft-lbs per pound.

6. The rotary impact tool of claim 1, wherein a ratio of a peak output speed of the drive assembly to the overall weight is greater than or equal to 280 revolutions per minute per pound.

7. The rotary impact tool of claim 1, wherein a ratio of peak impact frequency provided by the drive assembly to the overall weight is greater than or equal to 350 impacts per minute per pound.

8. The rotary impact tool of claim 1, wherein the second performance ratio of the rotary impact tool is greater than 2.2.

9. A rotary impact tool comprising:

a housing;

an electric motor supported in the housing;

a drive assembly for converting a continuous torque input from the motor to consecutive rotational impacts upon a workpiece, the drive assembly including an anvil having a bore in a distal end thereof for receipt of the workpiece or a tool bit for performing work on the workpiece, the bore defining a hexagonal cross-sectional shape in a plane oriented transverse to a rotational axis of the anvil, the bore having a nominal width of 7/16 inches, a hammer that is both rotationally and axially movable relative to the anvil for imparting the consecutive rotational impacts upon the anvil, and a spring for biasing the hammer in an axial direction toward the anvil;

a battery pack supported by the housing for providing power to the motor, the battery pack having a nominal voltage of at least 18 Volts and a nominal capacity of at least 5 Ah;

wherein the rotary impact tool has an overall weight including the battery pack that is less than or equal to 7.5 lbs, wherein a mechanism efficiency of the rotary impact tool is defined as:

$$\eta_a = \frac{BPM \times KE_{Hammer,Drilling}}{\text{Voltage}_{motor} \times \text{Current}_{motor}},$$

wherein BPM is the number of impacts per minute, $KE_{Hammer,Drilling}$ is a kinetic energy of the hammer during a loaded condition and prior to impact with the anvil, $Voltage_{motor}$ is a voltage across the motor, and $Current_{motor}$ is a current drawn by the motor, wherein a third performance ratio ($PR_3$) of the rotary impact tool is defined as:

$$PR_3 = \left(\frac{\eta_a}{Mass_{hammer}}\right) \times \left(\frac{1}{60}\right),$$

wherein $Mass_{hammer}$ is a mass of the hammer, and wherein the third performance ratio of the rotary impact tool is greater than 2.

10. The rotary impact tool of claim 9, wherein a fourth performance ratio ($PR_4$) of the rotary impact tool is defined as:

$$PR_4 = \left(\frac{\eta_a \times RPM_{no-load}}{Mass_{hammer}}\right) \times \left(\frac{1}{3{,}600}\right),$$

wherein $RPM_{no-load}$ is a rotational frequency of the impact mechanism under a no-load condition, and wherein the fourth performance ratio of the rotary impact tool is greater than 65.

11. The rotary impact tool of claim 9, wherein the motor is a brushless electric motor including a stator having a nominal diameter of 60 mm and a plurality of stator windings, and a rotor positioned within the stator and having a plurality of permanent magnets.

12. The rotary impact tool of claim 9, wherein the drive assembly is configured to convert a continuous torque input from the motor to consecutive rotational impacts upon the workpiece of at least 900 ft-lbs of fastening torque, and wherein a ratio of the fastening torque to the overall weight is greater than or equal to 120 ft-lbs per pound.

13. The rotary impact tool of claim 9, wherein a ratio of a peak output speed of the drive assembly to the overall weight is greater than or equal to 280 revolutions per minute per pound.

14. The rotary impact tool of claim 9, wherein a ratio of peak impact frequency provided by the drive assembly to the overall weight is greater than or equal to 350 impacts per minute per pound.

15. The rotary impact tool of claim 9, wherein the third performance ratio of the rotary impact tool is greater than 2.2.

16. A rotary impact tool comprising:

a housing;

an electric motor supported in the housing;

a drive assembly for converting a continuous torque input from the motor to consecutive rotational impacts upon a workpiece, the drive assembly including an anvil having a bore in a distal end thereof for receipt of the workpiece or a tool bit for performing work on the workpiece, the bore defining a hexagonal cross-sectional shape in a plane oriented transverse to a rotational axis of the anvil, the bore having a nominal width of 7/16 inches, a hammer that is both rotationally and axially movable relative to the anvil for imparting the consecutive rotational impacts upon the anvil, and a spring for biasing the hammer in an axial direction toward the anvil;

a battery pack supported by the housing for providing power to the motor, the battery pack having a nominal voltage of at least 18 Volts and a nominal capacity of at least 5 Ah;

wherein the rotary impact tool has an overall weight including the battery pack that is less than or equal to 7.5 lbs, wherein a mechanism efficiency of the rotary impact tool is defined as:

$$\eta_a = \frac{BPM \times KE_{Hammer,Drilling}}{Voltage_{motor} \times Current_{motor}},$$

wherein BPM is the number of impacts per minute, $KE_{Hammer,Drilling}$ is a kinetic energy of the hammer during a loaded condition and prior to impact with the anvil, $Voltage_{motor}$ is a voltage across the motor, and $Current_{motor}$ is a current drawn by the motor, wherein a fourth performance ratio ($PR_4$) of the rotary impact tool is defined as:

$$PR_4 = \left(\frac{\eta_a \times RPM_{no-load}}{Mass_{hammer}}\right) \times \left(\frac{1}{3{,}600}\right),$$

wherein $RPM_{no-load}$ is a rotational frequency of the impact mechanism under a no-load condition and $Mass_{hammer}$ is a mass of the hammer, and wherein the fourth performance ratio of the rotary impact tool is greater than 65.

17. The rotary impact tool of claim 16, wherein the motor is a brushless electric motor including a stator having a nominal diameter of 60 mm and a plurality of stator windings, and a rotor positioned within the stator and having a plurality of permanent magnets.

18. The rotary impact tool of claim 16, wherein the drive assembly is configured to convert a continuous torque input from the motor to consecutive rotational impacts upon the workpiece of at least 900 ft-lbs of fastening torque, and wherein a ratio of the fastening torque to the overall weight is greater than or equal to 120 ft-lbs per pound.

19. The rotary impact tool of claim 16, wherein a ratio of a peak output speed of the drive assembly to the overall weight is greater than or equal to 280 revolutions per minute per pound.

20. The rotary impact tool of claim 16, wherein a ratio of peak impact frequency provided by the drive assembly to the overall weight is greater than or equal to 350 impacts per minute per pound.

21. The rotary impact tool of claim 16, wherein the fourth performance ratio of the rotary impact tool is greater than 70.

22. The rotary impact tool of claim 16, wherein the fourth performance ratio of the rotary impact tool is greater than 75.

* * * * *